(12) United States Patent
Ito et al.

(10) Patent No.: US 11,940,564 B2
(45) Date of Patent: Mar. 26, 2024

(54) LASER RADAR DEVICE

(71) Applicant: MITSUBISHI ELECTRIC CORPORATION, Tokyo (JP)

(72) Inventors: Yusuke Ito, Tokyo (JP); Takayuki Yanagisawa, Tokyo (JP); Hiroshi Aruga, Tokyo (JP); Masaharu Imaki, Tokyo (JP); Wataru Yoshiki, Tokyo (JP); Shumpei Kameyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 475 days.

(21) Appl. No.: 17/236,359

(22) Filed: Apr. 21, 2021

(65) Prior Publication Data
US 2021/0239805 A1 Aug. 5, 2021

Related U.S. Application Data

(63) Continuation of application No. PCT/JP2018/044873, filed on Dec. 6, 2018.

(51) Int. Cl.
*G02B 26/08* (2006.01)
*G01S 7/481* (2006.01)
*G02B 26/10* (2006.01)

(52) U.S. Cl.
CPC .......... *G01S 7/4817* (2013.01); *G02B 26/101* (2013.01)

(58) Field of Classification Search
CPC ...... G01S 7/4817; G01S 7/4812; G01S 17/89; G02B 26/101; G02B 26/10
See application file for complete search history.

(56) References Cited

U.S. PATENT DOCUMENTS

| 9,007,600 B2 | 4/2015 | Imaki et al. |
| 10,546,561 B2 * | 1/2020 | Kusanagi ............... G02B 27/01 |
| 2013/0027715 A1 | 1/2013 | Imaki et al. |

FOREIGN PATENT DOCUMENTS

| JP | WO2011/138895 A1 | 7/2013 |
| JP | 2015-125317 A | 7/2015 |

OTHER PUBLICATIONS

International Search Report (PCT/ISA/210) issued in PCT/JP2018/044873 dated Mar. 12, 2019.

* cited by examiner

*Primary Examiner* — Euncha P Cherry
(74) *Attorney, Agent, or Firm* — Birch, Stewart, Kolasch & Birch, LLP

(57) ABSTRACT

A laser radar device includes: a light source for outputting laser light; a scanner for causing the laser light to scan; a first optical system for receiving the laser light caused to scan by the scanner and incident on the first optical system and emitting the incident laser light in such a manner that a horizontal component of the incident laser light is different from a horizontal component of the laser light to be emitted; and a second optical system for receiving the laser light caused to scan by the scanner and incident on the second optical system and emitting the incident laser light in such a manner that an incident area of the incident laser light in the horizontal direction is the same as an incident area of the first optical system in the horizontal direction, and an emission area of the incident laser light is different from an emission area of the first optical system.

5 Claims, 12 Drawing Sheets

LASER RADAR DEVICE

CROSS REFERENCE TO RELATED APPLICATIONS

This application is a Continuation of PCT International Application No. PCT/JP2018/044873, filed on Dec. 6, 2018, which is hereby expressly incorporated by reference into the present application.

TECHNICAL FIELD

The present invention relates to a laser radar device.

BACKGROUND ART

The present invention relates to a laser radar device for obtaining three-dimensional information, by irradiating a distance measurement target with laser light, receiving reflection light from the target, calculating a distance to the target with a time difference between the time when transmission light is emitted and the time when the reception light is received, and performing a beam scan. A conventional laser radar device disclosed in Patent Literature 1 below detects a distance and an intensity from a received signal, and generates a distance image and an intensity image on the basis of a beam scan angle at this time.

CITATION LIST

Patent Literature

Patent Literature 1: JP 2011/138895 A

SUMMARY OF INVENTION

Technical Problem

In a conventional configuration, when there is a mechanical scan angle dynamic range in a movable optical element for performing a beam scan (for example, a galvano scanner, MEMS), a viewing angle as a device is limited disadvantageously due to limitation of a beam scan area.

Particularly when MEMS is used, there is an advantage in terms of small size, light weight, and robustness (which means environmental resistance here), but the dynamic range is narrow and smaller than a desired viewing angle required for a laser radar device, and it is difficult to ensure a desired viewing angle disadvantageously.

The present invention has been achieved in order to solve the above problems, and an object of the present invention is to widen a viewing angle of a laser sensor device and ensure a desired viewing angle by inclusion of an optical system for widening a scan area even a case where the scan area is limited by a mechanical scan angle dynamic range in a movable optical element constituting a beam scan unit. Note that hereinafter, a beam scan will be referred to as "scan", and a movable optical element for performing a beam scan will be referred to as "scanner".

Solution to Problem

A laser radar device of the present invention includes: a light source to output laser light; a scanner to cause the laser light to scan; a first optical system to receive the laser light caused to scan by the scanner and incident on the first optical system, and emit the incident laser light in such a manner that a horizontal component of the incident laser light is different from a horizontal component of the laser light to be emitted; and a second optical system to receive the laser light caused to scan by the scanner and incident on the second optical system, and emit the incident laser light in such a manner that an incident area of the incident laser light in the horizontal direction is the same as an incident area of the first optical system in the horizontal direction, and an emission area of the incident laser light is different from an emission area of the first optical system. The first optical system emits the incident laser light in such a manner that a positive/negative sign of a vertical component of the incident laser light is different from a positive/negative sign of a vertical component of the laser light to be emitted, and the second optical system emits the incident laser light in such a manner that an incident area of the second optical system in the vertical direction and an incident area of the first optical system in the vertical direction are symmetric with respect to an optical axis, and a positive/negative sign of a vertical component of the incident laser light is different from a positive/negative sign of a vertical component of the laser light to be emitted.

Advantageous Effects of Invention

According to the laser radar device according to the present invention, by inclusion of the wide-angle optical system, it is possible to widen a viewing angle of a laser sensor device and to obtain a desired viewing angle, even a case where a scan area is limited by a mechanical scan angle dynamic range in a movable optical element constituting a beam scan unit and it is difficult to ensure a desired viewing angle for the laser radar device.

DESCRIPTION OF EMBODIMENTS

First Embodiment

Figure 1:
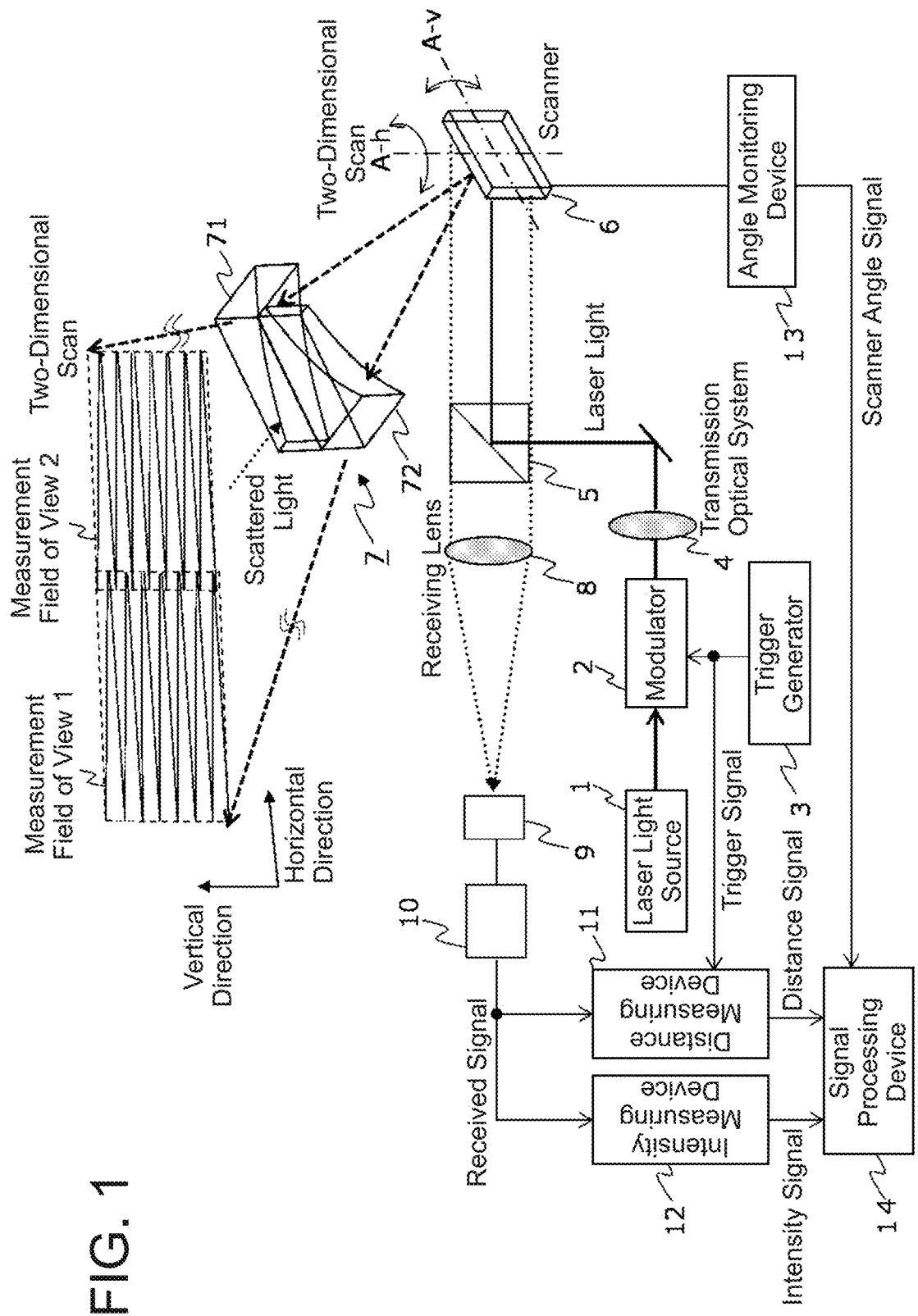
FIG. 1 is a configuration diagram illustrating a configuration example of a laser radar device according to a first embodiment of the present invention.

FIG. 1 is a configuration diagram illustrating a configuration example of a laser radar device according to a first embodiment of the present invention. The laser radar device includes a laser light source 1, a modulator 2, a trigger generator 3, a transmission optical system 4, a transmission and reception separating optical system 5, a scanner 6, a wide-angle optical system 7, a receiving lens 8, a light receiving element 9, a current to voltage converter 10, a distance measuring device 11, an intensity measuring device 12, an angle monitoring device 13, and a signal processing device 14.

The laser light source 1 is a laser light source that outputs laser light having a predetermined wavelength and a predetermined intensity. As for the laser light source 1, for example, a laser diode or a fiber laser is used. The wavelength and intensity are set depending on an application, specifications, and a usage environment of the laser radar device.

The modulator 2 is a modulator that modulates laser light in accordance with a trigger signal output from the trigger generator 3 and outputs the modulated laser light as pulsed light. As for the modulator 2, for example, an acousto optical modulator (AOM) or a semiconductor optical amplifier (SOA) is used.

The trigger generator 3 is a trigger generator that outputs a trigger signal indicating a modulation timing for laser light. As for the trigger generator 3, for example, a digital to analog (DA) board, a field-programmable gate array (FPGA), or a function generator is used.

The transmission optical system 4 is a transmission optical system that forms laser light pulsed by the modulator 2 into laser light having a predetermined beam diameter and a predetermined spread angle, and outputs the laser light as transmission light. Regarding a beam diameter of laser light, the transmission optical system 4 is designed or set depending on specifications such as a finally output distance, spatial resolution of an intensity image, and angular resolution for the laser radar device. Regarding a horizontal beam spread angle of laser light, the transmission optical system 4 adjusts a horizontal spread angle of transmission light output from the transmission optical system 4 in advance in such a manner that transmission light output from the wide-angle optical system 7 to a distance measurement target is collimated light. Similar to the horizontal direction, regarding a vertical beam spread angle, the transmission optical system 4 adjusts a vertical spread angle of transmission light output from the transmission optical system 4 in advance in such a manner that transmission light output from the wide-angle optical system 7 to a distance measurement target is collimated light. For example, the transmission optical system 4 includes a spherical or aspherical convex lens, a concave lens, a plano-convex lens, a plano-concave lens, or a combination thereof.

The transmission and reception separating optical system 5 is a transmission and reception separating optical system that guides transmission light output from the transmission optical system 4 to the scanner 6, receives scattered light from a distance measurement target, and guides the received scattered light to the receiving lens 8. As for the transmission and reception separating optical system 5, for example, a fiber type circulator or a space type polarizing beam splitter is used.

The scanner 6 is a scanner that has two axes of rotation in the horizontal direction and the vertical direction, and angularly scans transmission light in a mechanical angular scan dynamic range. When an axis for performing a scan in the vertical direction is referred to as A-v and an axis for performing a scan in the horizontal direction is referred to as A-h, the scanner 6 has a function of performing a two-dimensional scan by performing an angular scan in each of the directions at a predetermined cycle on the basis of each of the axes. As for the scanner 6, for example, a resonance type scanner such as a MEMS mirror or a resonant scanner, or a non-resonance type scanner such as a galvano scanner is used.

The wide-angle optical system 7 is a wide-angle optical system that includes a wide-angle upper stage optical system 71 (an example of the first optical system) and a wide-angle lower stage optical system 72 (an example of the second optical system), receives transmission light caused to two-dimensionally scan by the scanner, emits the received transmission light toward a distance measurement target direction in such a manner that a scan angle is larger than a horizontal beam scan angle dynamic range of the scanner 6 in the horizontal direction, receives scattered light from the distance measurement target, and guides the received scattered light to the scanner 6.

In order to obtain the above function, the wide-angle optical system 7 has the following structure. The wide-angle optical system 7 includes the wide-angle upper stage optical system 71 and the wide-angle lower stage optical system 72 arranged 180 degrees rotationally symmetrically with respect to an axis (optical axis) where a vertical scan angle of the scanner is 0 deg. Incident surfaces of the upper stage and the lower stage are formed by curved surfaces that are concave surfaces with respect to the horizontal direction. By forming the incident surfaces by concave surfaces, incident light is diffused, thereby obtaining an angle-widening action in the horizontal direction. A radius of curvature when the concave surface is a spherical surface, a polynomial coefficient when the concave surface is an aspherical surface, and the like are determined in design. By making the curved surface of the incident surface of the upper stage asymmetric with respect to the axis (optical axis) where a horizontal scan angle is 0 deg, a diffusion action is biased in a negative or positive direction in the horizontal direction. As described above, by arranging the wide-angle upper stage optical system 71 and the wide-angle lower stage optical system 72 symmetrically with respect to the optical axis in the vertical direction, incident light is diffused as emission light in the positive and negative directions in the horizontal direction by each of the wide-angle upper stage optical system 71 and the wide-angle lower stage optical system 72. As a result, the field of view is widened equally in the horizontal direction. With respect to the vertical direction, incident surfaces of lenses of the wide-angle upper stage optical system 71 and the wide-angle lower stage optical system 72 are formed by flat surfaces and are arranged so as to be vertical to the optical axis. Emission surfaces of both the wide-angle upper stage optical system 71 and the wide-angle lower stage optical system 72 are formed by flat surfaces in the horizontal direction. By arranging the emission surfaces in such a manner that an angle formed between each of the emission surfaces and the optical axis is equal to or less than 90 degrees with respect to the vertical direction, an inclined flat surface is obtained. The inclination causes fields of view of the upper and lower stages that are deviating from each other in the vertical direction to substantially coincide with each other in a measurement field of view at a distance. The wide-angle optical system 7 is constituted by a material having a refractive index larger than a refractive index under a usage environment. For example, when the wide-angle optical system 7 is used in the atmosphere and the refractive index of the atmosphere is 1, the wide-angle optical system 7 is constituted by a material having a refractive index larger than 1. Details will be described below.

Figure 2:
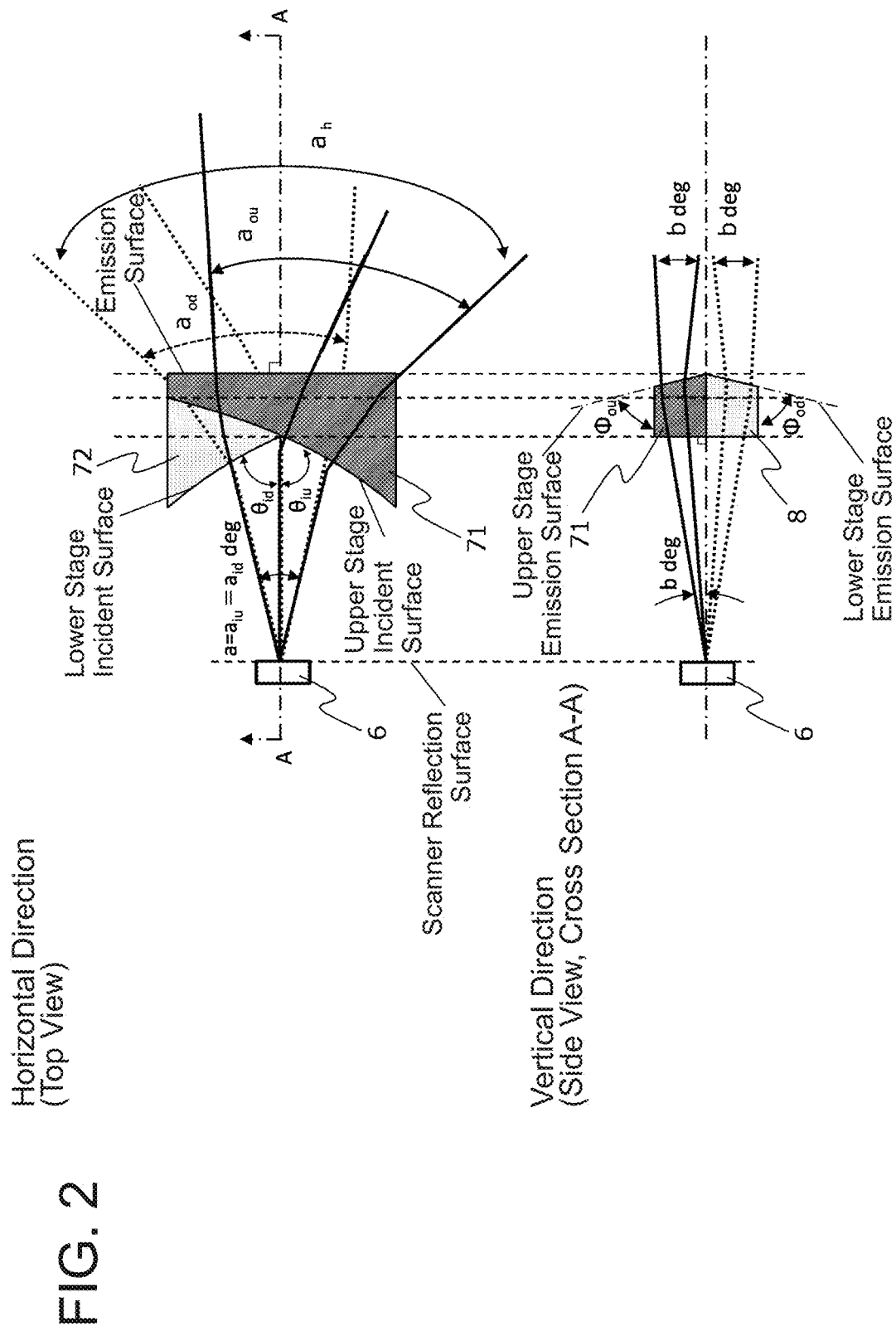
FIG. 2 is a configuration diagram illustrating a configuration example of a wide-angle optical system 7 in the laser radar device according to the first embodiment of the present invention.

FIG. 2 is a configuration diagram illustrating a configuration example of the wide-angle optical system 7 in the laser radar device according to the first embodiment of the present invention.

Hereinafter, the configuration of the wide-angle optical system 7 will be described by referring to FIG. 2.

In FIG. 2, the solid line indicates a ray caused to scan by the wide-angle upper stage optical system 71, and the dotted line indicates a ray caused to scan by the wide-angle lower stage optical system 72. The line A-A indicated by the alternate long and short dash line indicates an optical axis, and all the alternate long and short dash lines indicate lines parallel to the optical axis.

As illustrated in the vertical direction (side view) of FIG. 2, the wide-angle optical system 7 includes the wide-angle upper stage optical system 71 and the wide-angle lower stage optical system 72 arranged symmetrically with respect to an axis (optical axis) where a vertical scan angle of the scanner is 0 deg.

In FIG. 2, a surface on which transmission light caused to two-dimensionally scan by the scanner 6 is incident in the wide-angle optical system 7 is referred to as "wide-angle optical system incident surface", and a surface from which transmission light is emitted in the wide-angle optical system 7 is referred to as "wide-angle optical system emission surface".

An incident surface of the wide-angle upper stage optical system 71 is referred to as an upper stage incident surface, an emission surface of the wide-angle upper stage optical system 71 is referred to as an upper stage emission surface, an incident surface of the wide-angle lower stage optical system 72 is referred to as a lower stage emission surface, and an emission surface of the wide-angle lower stage optical system 72 is referred to as a lower stage emission surface.

Note that when it is simply described as an incident surface and an emission surface, it means incident surfaces and emission surfaces of both the wide-angle upper stage optical system 71 and the wide-angle lower stage optical system 72. When it is described as an upper stage, it means the wide-angle upper stage optical system 71, and when it is described as a lower stage, it means the wide-angle lower stage optical system 72.

$\theta_{iu}$ indicates an angle between the optical axis and the upper stage incident surface, and $\theta_{id}$ indicates an angle between the optical axis and the lower stage incident surface, and $\theta_{iu}=\theta_{id}$ is satisfied. $\Phi_{ou}$ indicates an angle between the optical axis and the upper stage emission surface, and $\Phi_{od}$ indicates an angle between the optical axis and the lower stage emission surface, and $\Phi_{ou}=\Phi_{od}$ is satisfied. In the side view of FIG. 2, $\Phi_{ou}$ and $\Phi_{od}$ are defined in such a manner that a counterclockwise direction from the optical axis is negative and a clockwise direction from the optical axis is positive.

A horizontal scan angle dynamic range of the scanner 6 is defined as $a=a_{iu}=a_{id}$ deg, and a vertical scan angle dynamic range of the scanner 6 is defined as 2b deg. $a_{iu}$ indicates a horizontal scan angle dynamic range of transmission light incident on the wide-angle upper stage optical system 71, and $a_{id}$ indicates a horizontal scan angle dynamic range of transmission light incident on the wide-angle lower stage optical system 72. $a_{ou}$ indicates a horizontal scan angle dynamic range of transmission light that has passed through the wide-angle upper stage optical system 71, and $a_{od}$ indicates a horizontal scan angle dynamic range of transmission light that has passed through the wide-angle lower stage optical system 72. Here, $a_{ou}>a_{iu}$ and $a_{od}>a_{id}$ are satisfied.

A scan area of the scanner 6 is $a=a_{iu}=a_{id}$ deg, and the center line of the scan area coincides with the optical axis. Therefore, a horizontal incident area of transmission light of the wide-angle upper stage optical system 71 and the wide-angle lower stage optical system 72 is $a=a_{iu}=a_{id}$ deg, and the center line of the horizontal incident area coincides with the optical axis. The center line is a line indicating the center of the incident area. That is, the center line of the horizontal incident area of the wide-angle upper stage optical system 71 coincides with that of the wide-angle lower stage optical system 72. Here, the optical axis is a line vertical to a reflection surface of the scanner 6. Usually, the line is defined as a line intersecting with the center of the scanner 6, but is not limited to the line intersecting with the center in defining an angle in the scan area.

b indicates a vertical dynamic range of transmission light incident on the wide-angle upper stage optical system 71 or the wide-angle lower stage optical system 72. Therefore, when a horizontal scan angle dynamic range of transmission light incident on the wide-angle upper stage optical system 71 and a horizontal scan angle dynamic range of transmission light incident on the wide-angle lower stage optical system 72 are combined, a vertical scan angle dynamic range of the scanner 6 is obtained. The vertical scan angle dynamic range of transmission light that has passed through the wide-angle upper stage optical system 71 or the wide-angle lower stage optical system 72 is b.

As illustrated in the horizontal direction (top view) of FIG. 2, the wide-angle optical system 7 is formed and constituted in such a manner that curved surfaces forming the incident surfaces of the upper and lower stage are inclined by $\theta_{iu}$ and $\theta_{id}$ with respect to the optical axis, respectively, the absolute values of $\theta_{iu}$ and $\theta_{id}$ are equal to each other, $\theta_{iu}$ is an angle formed from the optical axis in a clockwise direction, and $\theta_{id}$ is an angle formed from the optical axis in a counterclockwise direction. This means that it is constituted in such a manner that a normal vector of the upper stage incident surface and a normal vector of the lower stage incident surface are symmetric with respect to the optical axis.

In the top view of FIG. 2, the wide-angle upper stage optical system 71 and the wide-angle lower stage optical system 72 are arranged with respect to the optical axis in such a manner that rays of a full angle a deg obtained by scanning by the scanner 6 are all incident on the incident surfaces of the wide-angle upper stage optical system 71 and the wide-angle lower stage optical system 72.

In the top view of FIG. 2, the wide-angle upper stage optical system 71 and the wide-angle lower stage optical system 72 are arranged in such a manner that an intersection of the incident surface of the wide-angle upper stage optical system 71 and the incident surface of the wide-angle lower stage optical system 72 is located on the optical axis.

In the side view of FIG. 2, the wide-angle upper stage optical system 71 and the wide-angle lower stage optical system 72 are arranged in such a manner that the angle $\Phi_{ou}$ of the upper stage incident surface with respect to the optical axis and the angle $\Phi_{od}$ of the lower stage incident surface with respect to the optical axis have an equal absolute value, which is equal to or less than 90 deg, and so as to be symmetric with respect to the optical axis.

The wide-angle upper stage optical system 71 and the wide-angle lower stage optical system 72 are arranged symmetrically with respect to the optical axis in the vertical direction in such a manner that, among full angle 2b deg rays obtained by scanning by the scanner 6, one b deg ray is incident on the wide-angle upper stage optical system 71, and the other b deg ray is incident on the wide-angle lower stage optical system 72.

In the side view of FIG. 2, the wide-angle upper stage optical system 71 and the wide-angle lower stage optical system 72 are arranged in such a manner that a vertical component of a normal vector of the incident surface of the wide-angle upper stage optical system 71 coincides with a vertical component of a normal vector of the incident surface of the wide-angle lower stage optical system 72, which is 0 here. In other words, this means that, in the side view of FIG. 2, an angle between the incident surface of the wide-angle upper stage optical system 71 and the optical axis and an angle between the incident surface of the wide-angle lower stage optical system 72 and the optical axis are both 90 deg.

In the side view of FIG. 2, due to the above arrangement, an incident angle of transmission light with respect to the incident surfaces of the wide-angle upper stage optical system 71 and the wide-angle lower stage optical system 72 is from $\pi/2$ to $\pi/2-b$.

In the side view of FIG. 2, an incident angle of transmission light with respect to the emission surface of the wide-angle upper stage optical system 71 is from $\sin^{-1}(\sin(b)/n)+\Phi_{ou}$ to $\Phi_{ou}$, and an incident angle of transmission light with respect to the emission surface of the wide-angle lower stage optical system 72 is from $\sin^{-1}(\sin(b)/n)++\Phi_{od}$ to $\Phi_{od}$.

In FIG. 2, the incident surface of the wide-angle optical system 7 is formed by a curved surface, but may be a flat surface, a spherical surface, or an aspherical surface.

Note that the incident surface may be formed by a flat surface. In this case, a horizontal scan angle after emission from each of the upper stage and the lower stage of the wide-angle optical system is a deg, but as described above, by forming the wide-angle optical systema as described above, a horizontal viewing angle an for the laser radar device obtains a scan angle of 2a deg.

When the incident surface is formed by a curved surface, a horizontal scan angle after emission from each of the upper stage and the lower stage of the wide-angle optical system 7 is larger than a deg, and by forming the wide-angle optical system 7 as described above, a horizontal viewing angle (scan angle) an for the laser radar device is larger than 2a deg.

Regarding the lens shapes of the wide-angle upper stage optical system 71 and the wide-angle lower stage optical system 72, in the first embodiment, the incident surfaces of the lenses are formed by curved surfaces with respect to the horizontal direction. With respect to the vertical direction, incident surfaces of the lenses are formed so as to be vertical to the optical axis. Emission surfaces of both the wide-angle upper stage optical system 71 and the wide-angle lower stage optical system 72 are formed by flat surfaces and are formed as described above.

By forming the wide-angle optical system 7 as described above, the incident surfaces of the wide-angle upper stage optical system 71 and the wide-angle lower stage optical system 72 in the horizontal direction with respect to transmission light are curved surfaces and the emission surfaces thereof in the horizontal direction with respect to transmission light are flat surfaces. Therefore, the horizontal scan angle dynamic range is widened.

In addition, since the wide-angle optical system 7 is formed as described above, an optical axis ray of the wide-angle upper stage optical system 71 is emitted in a positive direction with respect to the optical axis in the horizontal direction. Similarly, an optical axis ray of the wide-angle lower stage optical system 72 is emitted in a negative direction with respect to the optical axis. In other words, this means that a horizontal component of the center line of an emission area of the wide-angle upper stage optical system 71 is different from a horizontal component of the center line of an emission area of the wide-angle lower stage optical system 72.

In addition, by forming the wide-angle optical system 7 as described above, the incident surfaces and the emission surfaces of the wide-angle upper stage optical system 71 and the wide-angle lower stage optical system 72 in the vertical direction are flat surfaces with respect to transmission light, and therefore a scan angle dynamic range is not widened in the vertical direction.

In addition, since the wide-angle optical system 7 is formed as described above, an optical axis ray of the wide-angle upper stage optical system 71 is emitted in a negative direction with respect to the optical axis in the vertical direction. Similarly, an optical axis ray of the wide-angle lower stage optical system 72 is emitted in a positive direction with respect to the optical axis.

The wide-angle optical system 7 is constituted by a material having a refractive index larger than a refractive index under a usage environment. For example, when the wide-angle optical system 7 is used in the atmosphere and the refractive index of the atmosphere is 1, the wide-angle optical system 7 is constituted by a material having a refractive index equal to or larger than 1. For example, when the wide-angle optical system 7 is used in water and the refractive index of water is 1.3, the wide-angle optical system 7 is constituted by a material having a refractive index equal to or larger than 1.3. When refractive indices differ depending on wavelengths, the wide-angle optical system 7 is constituted by a material having a refractive index larger than a reference, the reference being a refractive index at a wavelength used under a usage environment. Note that the wide-angle optical system 7 does not have to have a two-stage structure of upper and lower stages. In addition, AR coating may be applied to the incident surface and the emission surface.

The receiving lens 8 is a receiving lens that collects scattered light from a distance measurement target on the light receiving element 9. As for the receiving lens 8, for example, a spherical or aspherical convex lens, a concave lens, a plano-convex lens, a plano-concave lens, or a combination thereof is used.

The light receiving element 9 is a light receiving element that receives scattered light collected by the receiving lens 8, converts the received scattered light into a current, and outputs the current as a reception current signal.

As for the light receiving element 9, for example, a photodiode, an avalanche photodiode, or a photomultiplier tube is used.

The current to voltage converter 10 is a current to voltage converter 10 that converts the reception current signal output from the light receiving element 9 into a voltage and outputs the voltage as a reception voltage signal. As for the current to voltage converter 10, for example, a transimpedance amplifier is used.

The distance measuring device 11 is a distance measuring device that detects a peak voltage value of the reception voltage signal output from the current to voltage converter 10, measures a time difference ($\Delta t$) between the reception voltage signal and a trigger signal, calculates a distance ($\Delta L$) corresponding to the time difference by using a calculation formula, $\Delta L$=light velocity×$\Delta t$/2, and outputs the distance ($\Delta L$) as a distance signal. As for the distance measuring device 11, for example, a time to digital converter (TDC) circuit or a time to amplitude converter (TAC) circuit is used. Note that the conversion from the time difference to the distance may be calculated using the above calculation formula on software (S/W).

The intensity measuring device 12 is an intensity measuring device that records a peak voltage value of the reception voltage signal (pulse signal) output from the current to voltage converter 10 and outputs the recorded peak voltage value as an intensity signal. As for the intensity measuring device 12, for example, a peak hold circuit is used.

The angle monitoring device 13 is an angle monitoring device that monitors the angle of the scanner 6 and outputs the monitored angle of the scanner 6 as a scanner angle signal to the signal processing device 14. As for the angle monitoring device 13, for example, a position sensitive detector (PSD) is used.

The signal processing device 14 is a signal processing device that generates a distance image and an intensity image from a distance signal, an intensity image, and a scanner angle signal. As for the signal processing device 14, for example, a field-programmable gate array (FPGA), a microcomputer, a personal computer (PC), or a combination thereof is used. When generating an image, the FPGA or the microcomputer converts a scanner angle signal and a distance signal into horizontal and vertical distances, and the PC displays an image after the conversion. Note that the conversion into the horizontal and vertical distances may be performed by S/W on the PC.

Next, an operation of the laser radar device according to the first embodiment of the present invention will be described.

The laser light source 1 outputs laser light at a predetermined wavelength and a predetermined intensity, and outputs the laser light to the modulator 2.

The trigger generator 3 outputs a trigger signal that designates a modulation timing for the laser light to the modulator 2.

The modulator 2 modulates the laser light output from the laser light source 1 in accordance with the trigger signal, and outputs pulsed laser light to the transmission optical system 4.

The transmission optical system 4 receives the pulsed laser light output from the modulator 2, forms the received pulsed laser light into pulsed laser light having a predetermined beam diameter and a predetermined beam spread angle, and outputs the formed pulsed laser light as transmission light. Regarding a horizontal beam spread angle of laser light, the transmission optical system 4 adjusts a horizontal spread angle of transmission light output from the transmission optical system 4 in advance in such a manner that transmission light output from the wide-angle optical system 7 to a distance measurement target is collimated light. In addition, similar to the horizontal direction, regarding a vertical beam spread angle, the transmission optical system 4 adjusts a vertical spread angle of transmission light output from the transmission optical system 4 in advance in such a manner that transmission light output from the wide-angle optical system 7 to a distance measurement target is collimated light. Regarding a beam diameter, the transmission optical system 4 is adjusted depending on specifications of a finally output distance, spatial resolution of an intensity image, and angular resolution for the laser radar device.

Figure 3:
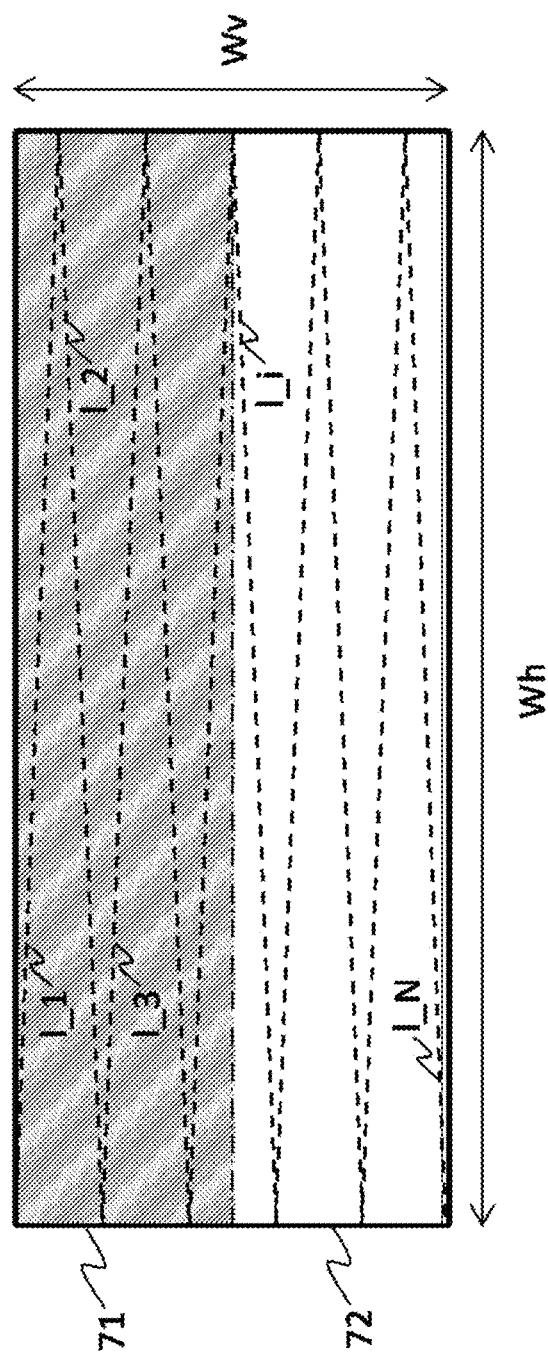
FIG. 3 is a diagram illustrating a scan position on an incident surface of the wide-angle optical system 7 of the laser radar device according to the first embodiment of the present invention.

FIG. 3 is a diagram illustrating a scan position on an incident surface of the wide-angle optical system 7 of the laser radar device according to the first embodiment of the present invention.

An operation of the scanner 6 will be described by referring to FIG. 3.

In FIG. 3, the hatched portion indicates the wide-angle upper stage optical system 71, and the non-hatched portion indicates an incident surface of the wide-angle lower stage optical system 72.

Wv in FIG. 3 indicates a vertical scan area of the scanner on the incident surface of the wide-angle optical system 7 (=vertical field of view of the scanner), and Wh indicates a horizontal scan area of the scanner on the incident surface of the wide-angle optical system 7(=horizontal field of view of the scanner).

The scanner 6 causes laser light to two-dimensionally scan by using the following operation, and emits the laser light caused to scan to the incident surface of the wide-angle optical system 7.

As illustrated in FIG. 3, by performing one or more cycles of horizontal scans while performing one cycle of vertical scans, the scanner 6 performs a scan in a zigzag shape on the incident surface of the wide-angle optical system 7.

For example, when 10 cycles of horizontal scans are performed during one cycle of vertical scans, on the incident surface of the wide-angle optical system 7, a zigzag-shaped scan including 10 lines in each of a forward path and a return path (one cycle in total) in the vertical direction is achieved.

In FIG. 3, 1_1, 1_2, . . . , 1_N indicate lines that are beam-scanned on the incident surface of the wide-angle optical system 7 by scanning in the vertical and horizontal directions by the scanner. 1 means a line, and a subscript number thereof indicates a line number. In the case of the above example, N=10. A position at which a distance is measured on this line depends on a pulse cycle of pulsed laser light. The pulse cycle is set depending on the number of pixels desired for the laser radar device. The number of pixels is set on the basis of spatial resolution and angular resolution desired for the laser radar device.

As described above, the scanner 6 emits the pulsed laser light caused to two-dimensionally scan to the wide-angle optical system 7.

Figure 4:
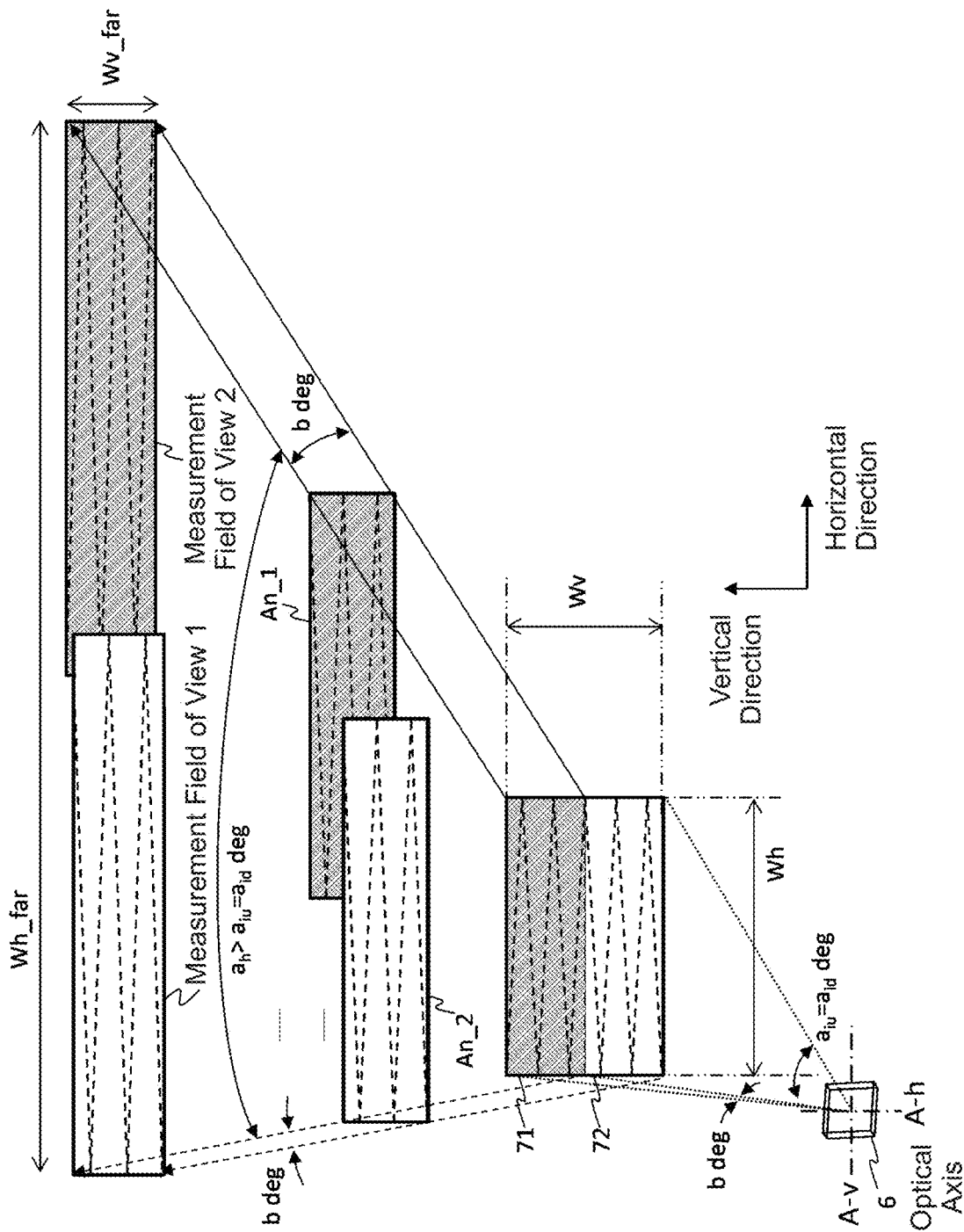
FIG. 4 is a diagram explaining widening of a field of view of the laser radar device according to the first embodiment of the present invention.

FIG. 4 is a diagram explaining widening of a field of view of the laser radar device according to the first embodiment of the present invention.

An operation of the wide-angle optical system 7 will be described by referring to FIG. 4.

In FIG. 4, An_1 and An_2 indicate areas scanned by the wide-angle upper stage optical system 71 and the wide-angle lower stage optical system 72 in a vicinity region after emission from the wide-angle optical system, respectively. A measurement field of view 1 and a measurement field of view 2 indicate measurement fields of view of the wide-angle upper stage optical system 71 and the wide-angle lower stage optical system 72 at a distance measurement target position, respectively. Wh_far indicates a horizontal scan area at the distance measurement target position, and Wv_far indicates a vertical scan area at the distance measurement target position.

When a horizontal scan angle dynamic range of the scanner 6 in the horizontal direction is $a=a_{iu}=a_{id}$ deg, as illustrated in FIG. 2, the horizontal scan angle $a_{ou}$ of the wide-angle upper stage optical system 71 and the horizontal scan angle $a_{od}$ of the wide-angle lower stage optical system 72 are larger than a deg, and therefore the horizontal scan angle (=horizontal viewing angle for the laser radar device) an after emission from the wide-angle optical system 7 is larger than 2a deg.

When a vertical scan angle dynamic range of the scanner in the vertical direction is 2b deg, as illustrated in FIG. 2, the scan angles of the wide-angle upper stage optical system 71 and the wide-angle lower stage optical system 72 are each b deg, and therefore the vertical scan angle (=vertical viewing angle for the laser radar device) after emission from the wide-angle optical system 7 is b deg.

As illustrated in FIG. 4, of transmission light emitted from the scanner 6 to the wide-angle optical system 7, the field of view of transmission light incident on the wide-angle upper stage optical system 71 is the measurement field of view 1 at the distance measurement target position, and the field of view of transmission light incident on the wide-angle lower stage optical system 72 is the measurement field of view 2 at the distance measurement target position. In this way, the wide-angle upper stage optical system 71 and the wide-angle lower stage optical system 72 obtain respective different measurement fields of view in the horizontal direction.

In the wide-angle optical system 7, the wide-angle upper stage optical system 71 and the wide-angle lower stage optical system 72 are arranged in the vertical direction, and the incident surface of the wide-angle upper stage optical system 71 in the horizontal direction and the incident surface of the wide-angle lower stage optical system 72 in the horizontal direction are arranged in different directions symmetrically with respect to the optical axis. As a result, a horizontal angle area of transmission light of the wide-angle upper stage optical system 71 is the same as that of the wide-angle lower stage optical system 72 immediately after emission from the scanner 6, but after emission from the wide-angle optical system 7, light is propagated in different horizontal directions between the wide-angle upper stage optical system 71 and the wide-angle lower stage optical system 72, and therefore a horizontal viewing angle for the laser device is large.

In addition, it is constituted in such a manner that the emission surface of the wide-angle upper stage optical system 71 in the vertical direction and the emission surface of the wide-angle lower stage optical system 72 in the vertical direction are arranged at different angles so as to be symmetric with respect to the optical axis. As a result, transmission light output from the wide-angle upper stage optical system 71 and the wide-angle lower stage optical system 72 is propagated so as to correct a vertical axis deviation due to a difference in incident angle between the wide-angle upper stage optical system 71 and the wide-angle lower stage optical system 72 in the vertical direction, and a vertical axis deviation at a desired distance measurement target position is small. The term axis deviation here means a deviation of a field of view of between the wide-angle upper stage optical system 71 and the wide-angle lower stage optical system 72 in the vertical direction. Regarding this deviation, in FIG. 4, An_1 and An_2 schematically indicate the fields of view of the wide-angle upper stage optical system 71 and the wide-angle lower stage optical system 72 at a position closer than a desired distance measurement target, and the measurement field of view 1 and the measurement field of view 2 indicate fields of view at the position of the desired distance measurement target.

As illustrated in FIG. 4, in the vicinity immediately after emission from the wide-angle optical system 7, the measurement field of view 1 and the measurement field of view 2 have a vertical axis deviation, but at a desired distance measurement target position (at far distance), the emission surfaces of the wide-angle upper stage optical system 71 and the wide-angle lower stage optical system 72 in the vertical direction are constituted as illustrated in FIG. 2, and therefore the vertical axis deviation between the measurement field of view 1 and the measurement field of view 2 is negligible.

By configuring the wide-angle optical system 7 as above, the vertical field of view of the scanner is divided into two by the wide-angle optical system and converted into respective horizontal fields of view at the distance measurement target position. As a result, a viewing angle equal to or larger than a horizontal scan angle dynamic range of the scanner is obtained as a viewing angle of the laser radar device.

Note that the measurement field of view 1 and the measurement field of view 2 may partially overlap with each other at the distance measurement target position. In a case where the measurement field of view 1 and the measurement field of view 2 are adjacent to each other without overlapping, when an incident surface is formed by a flat surface, an is 2a deg, and when the incident surface is formed by a curved surface, an is larger than 2a deg. In a case where the measurement field of view 1 and the measurement field of view 2 overlap with each other by c deg, an decreases by $2c$ deg.

In the above, the wide-angle optical system includes two stages composed of upper and lower stages, but may include a plurality of stages equal to or more than two stages. When the wide-angle optical system includes the plurality of stages, measurement fields of view equal to the number of stages are obtained, and by arranging the measurement fields of view in the horizontal direction by the wide-angle optical system, a measurement field of view equal to or larger than a horizontal scan angle dynamic range of the scanner is obtained.

Hereinafter, the operation of the present laser radar device after the wide-angle optical system 7 will be described again.

Scattered light on a distance measurement target object is output as reception light to the transmission and reception separating optical system 5 via the wide-angle optical system 7 and the scanner 6.

The transmission and reception separating optical system 5 outputs the scattered light from the distance measurement target object as reception light to the receiving lens 8.

The receiving lens 8 collects the reception light and collects the reception light on the light receiving element 9.

The light receiving element 9 receives the collected reception light, converts the received light into a current, and outputs a current signal of the converted reception light to the current to voltage converter 10. This current signal of the reception light is a pulsed signal.

The current to voltage converter 10 converts the current signal into a voltage signal and outputs the voltage signal to the distance measuring device 11 and the intensity measuring device 12.

The distance measuring device 11 measures a time difference between a reception voltage signal output from the current to voltage converter 10 and a trigger signal output from the trigger generator 3, calculates a distance corresponding to the time difference, and outputs the distance as a distance signal to the signal processing device 14.

The intensity measuring device 12 detects a peak voltage value of the reception voltage signal output from the current to voltage converter 10 and outputs the peak voltage value as an intensity signal to the signal processing device 14.

The signal processing device 14 generates an intensity image and a distance image from a scan angle signal output from the angle monitoring device 13, the intensity signal, and the distance signal. When the distance image and the intensity image are generated, horizontal and vertical distances are calculated from the scan angle signal and the distance signal. The scan angle signal is an angle after emission from the wide-angle optical system 7.

As is clear from the above, according to the first embodiment of the present invention, the wide-angle optical system 7 includes the wide-angle upper stage optical system 71 and the wide-angle lower stage optical system 72, the vertical field of view of the scanner is divided into two by the wide-angle optical system 7, and the divided field of view is converted into a horizontal field of view at the distance measurement target position. As a result, a viewing angle equal to or larger than a horizontal scan angle dynamic range of the scanner can be obtained as a viewing angle of the laser radar device.

Note that a manual or electric optical axis adjustment jig may be added to a jig that holds the wide-angle optical system 7.

Antireflection coating may be applied to an incident surface and an emission surface of the wide-angle optical system 7.

Here, the distance measurement method using pulsed light as transmission light has been exemplified, but widening of a field of view by the wide-angle optical system 7 may be applied to another method. Examples thereof include a continuous wave (CW) method and a frequency modulated continuous wave (FMCW) method.

The receiving lens 8 and the transmission optical system 4 may each include a plurality of optical elements.

When an incident surface of the wide-angle optical system 7 is formed by a curved surface, the curved surface may be spherical or aspherical.

The upper stage of the wide-angle optical system 7 (corresponding to the wide-angle upper stage optical system 71) and the lower stage thereof (corresponding to the wide-angle lower stage optical system 72) may be formed by integral shaving, or may be formed by manufacturing the upper and lower stages separately and joining the upper and lower stages together.

The two-dimensional scan in which light is incident on an incident surface of the wide-angle optical system 7 indicates scanning cycles in the horizontal and vertical directions of the scanner in such a manner that lines (1_1 to 1_N) in a forward path and a return path overlap with each other as illustrated in FIG. 3, but it is not limited thereto.

The incident surface of the wide-angle optical system 7 may be curved also with respect to the vertical direction. That is, the incident surface may be a toroidal surface. In this case, a vertical beam spread angle of the transmission optical system is adjusted so as to be a desired spread angle after emission from the wide-angle optical system.

Regarding an emission surface in the vertical direction, angles ($\Phi_{ou}$ and $\Phi_{od}$) of the emission surfaces of the upper and lower stages defined in FIG. 2 do not have to be equal to each other. When $\Phi_{ou}$ and $\Phi_{od}$ are equal to each other, the measurement field of view 1 and the measurement field of view 2 are arranged on the optical axis in the vertical direction at a desired observation distance, but when $\Phi_{ou}$ and $\Phi_{od}$ are different angles, the measurement field of view 1 and the measurement field of view 2 are arranged at positions deviating from the optical axis in the vertical direction at a distance measurement target position. As a supplement, when $\Phi_{ou}$ and $\Phi_{od}$ are equal to each other, the optical axis passes through the position of Wv_far/2 in FIG. 4, but when $\Phi_{ou}$ and $\Phi_{od}$ are different angles, the optical axis passes through a position deviating from the position of Wv_far/2.

In FIG. 2, the incident surface of the wide-angle optical system 7 in the horizontal direction is a curved surface, and the emission surface thereof in the vertical direction includes inclined flat surfaces which are constituted so as to have different directions between the upper and lower stages, but the shape of the incident surface in the horizontal direction and the shape of the emission surface in the vertical direction may be formed in such a manner that an incident direction of transmission light and an emission direction of the transmission light are opposite to each other. This case will be described below.

Figure 5:
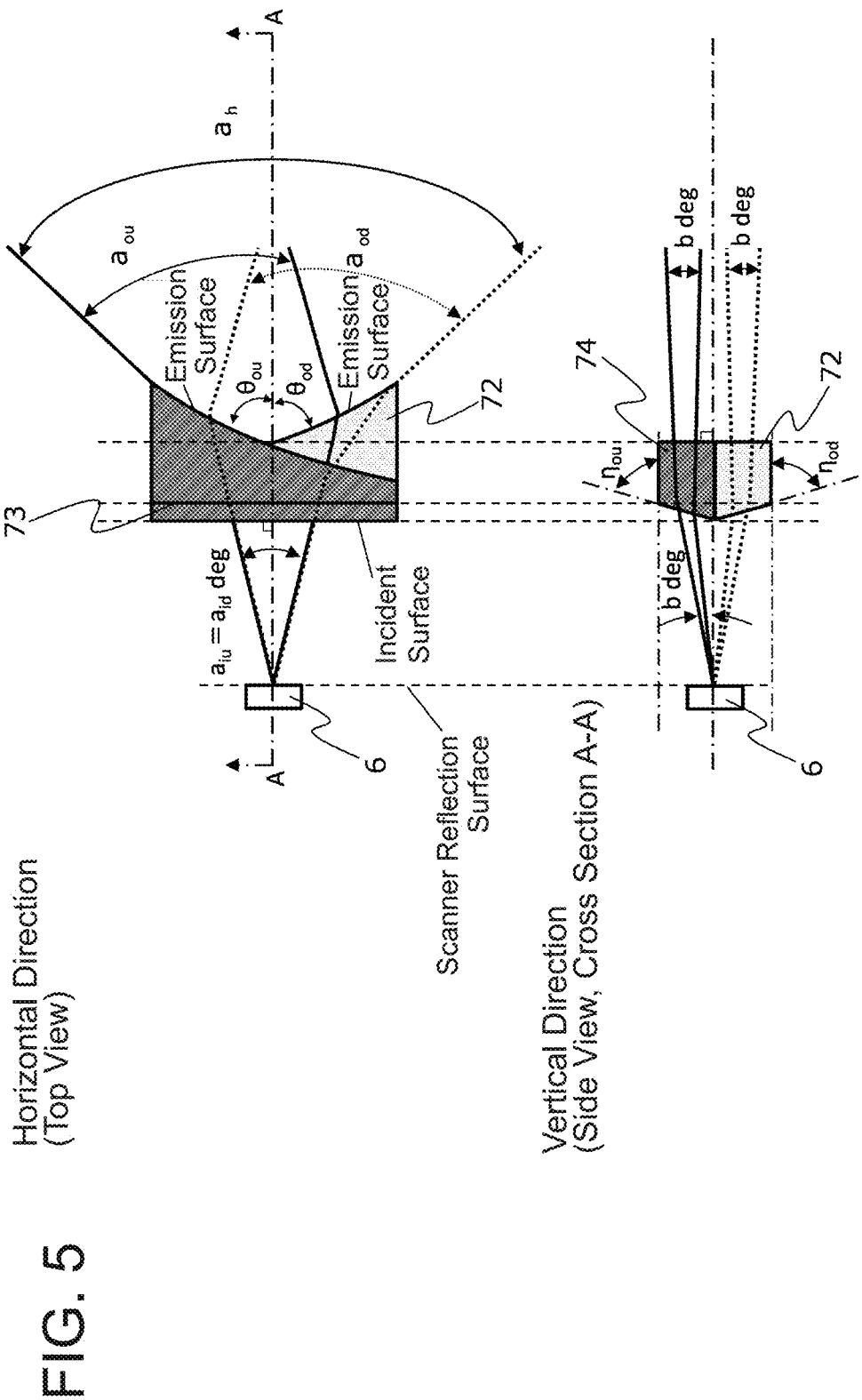
FIG. 5 is a configuration diagram explaining another configuration example of the wide-angle optical system 7 of the laser radar device according to the first embodiment of the present invention.

FIG. 5 is a configuration diagram explaining another configuration example of the wide-angle optical system 7 of the laser radar device according to the first embodiment of the present invention.

As illustrated in FIG. 5, the incident surface in the vertical direction may be an inclined flat surface, and the emission surface in the horizontal direction may be a curved surface. Definition of variables in FIG. 5 is similar to that in FIG. 2. Different variables will be defined below.

Regarding the incident surface in the vertical direction, angles ($\eta_{ou}$ and $\eta_{od}$) of the incident surfaces of the upper and lower stages with respect to the optical axis defined in FIG. 5 have an equal absolute value, which is equal to or less than 90 deg. Therefore, the upper and lower stages are formed so as to be in contact with each other in such a manner that when positive and negative angular directions from the optical axis are defined as illustrated in FIG. 5, the angle $\eta_{ou}$ of the incident surface of the upper stage is a positive direction from the optical axis, and the angle $\eta_{od}$ of the incident surface of the lower stage is a negative direction from the optical axis. That is, the incident surface of the upper stage and the incident surface of the lower stage are arranged symmetrically with respect to the optical axis.

Regarding the emission surface in the horizontal direction, as illustrated in the horizontal direction (top view) of FIG. 5, the angle $\theta_{ou}$ of the emission surface of the upper stage with respect to the optical axis defined in FIG. 5 is set so as to have the same absolute value as the angle $\theta_{od}$ of the emission surface of the lower stage. That is, the emission surface of the upper stage and the emission surface of the lower stage are arranged symmetrically with respect to the optical axis.

When the incident surface in the horizontal direction is formed by a curved surface, a part of transmission light input by the scanner may cause vignetting due to a step generated at a boundary between the upper and lower stages, but as illustrated in FIG. 5, by forming the incident surface in the horizontal direction by an inclined flat surface, such vignetting is reduced.

As illustrated in FIG. 5, even with a configuration in which an inclined flat surface is used for the incident surface in the horizontal direction and a curved surface is used for the emission surface in the horizontal direction, a horizontal viewing angle is widened.

The emission surface of the wide-angle optical system 7 in the horizontal direction does not have to be a flat surface. As an example, the emission surface in the horizontal direction may have a curvature. For an example, as illustrated in FIG. 2, when the incident surface is formed by a concave surface, and the emission surface is also formed by a concave surface, the horizontal viewing angle is further widened by an effect of a biconcave lens.

The transmission light in the horizontal and vertical directions after emission from the wide-angle optical system 7 does not have to be collimated light.

It has been described that the scanner 6 has two axes for performing an angular scan, but alternatively, two scanners each having one axis for performing an angular scan may be used.

Second Embodiment

In the first embodiment, the wide-angle optical system 7 is made of a transparent material, but in the second embodiment, a wide-angle optical system 20 is made of a reflective material.

Figure 6:
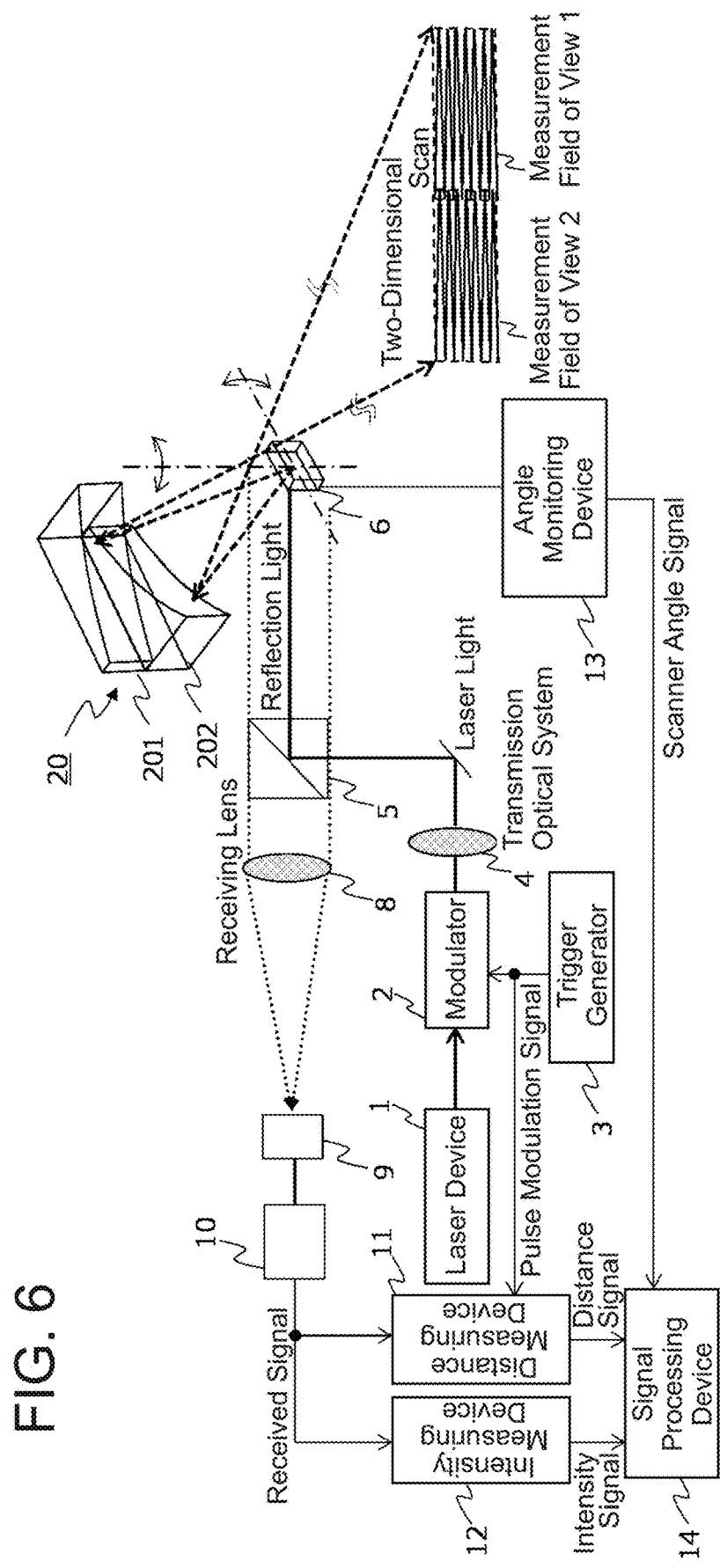
FIG. 6 is a configuration diagram illustrating a configuration example of a laser radar device according to a second embodiment of the present invention.

FIG. 6 is a configuration diagram illustrating a configuration example of a laser radar device according to the second embodiment of the present invention. This laser radar device according to the second embodiment of the present invention includes a laser light source 1, a modulator 2, a trigger generator 3, a transmission optical system 4, a transmission and reception separating optical system 5, a scanner 6, a wide-angle optical system 20, a receiving lens 8, a light receiving element 9, a current to voltage converter 10, a distance measuring device 11, an intensity measuring device 12, an angle monitoring device 13, and a signal processing device 14.

Figure 7:
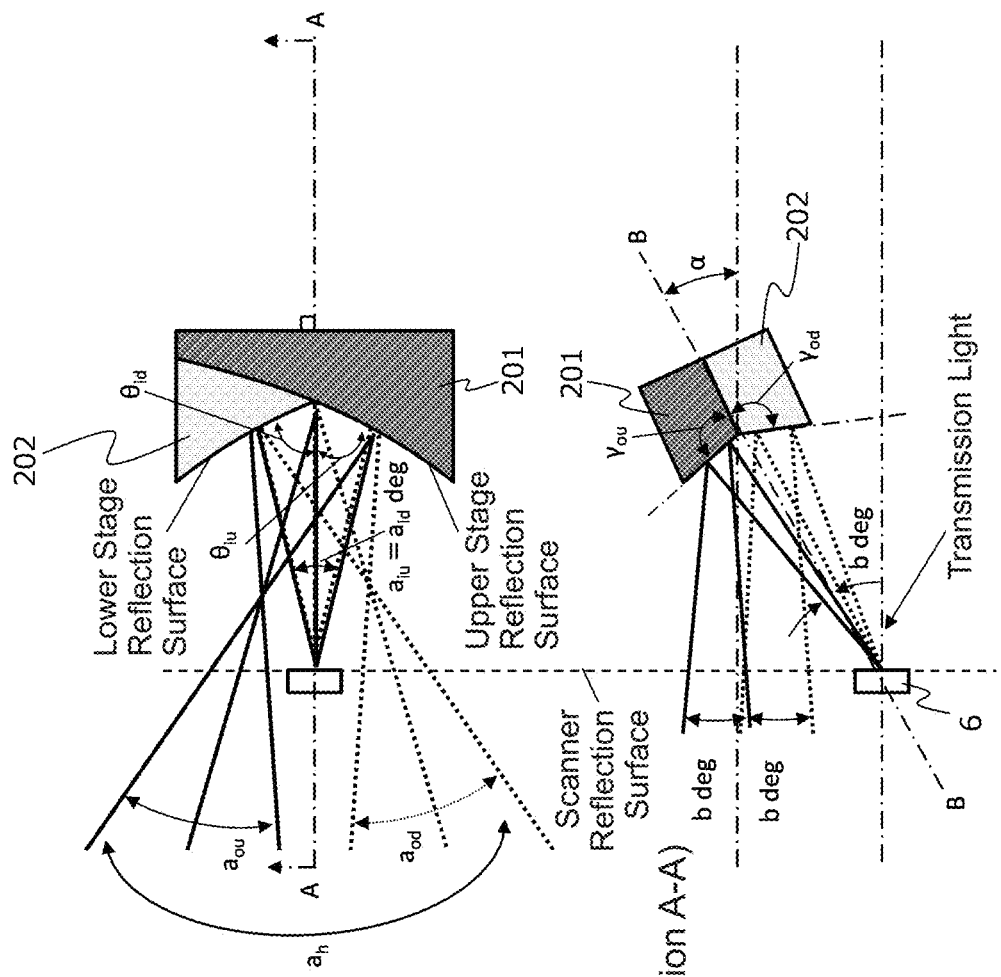
FIG. 7 is a configuration diagram illustrating a configuration example of a wide-angle optical system 20 in the laser radar device according to the first embodiment of the present invention.

FIG. 7 is a configuration diagram illustrating a configuration example of the wide-angle optical system 20 in the laser radar device according to the first embodiment of the present invention. The wide-angle optical system 20 includes a wide-angle upper stage optical system 201 and a wide-angle lower stage optical system 202. Note that, hereinafter, when it is described as an upper stage, it indicates the wide-angle upper stage optical system 201, and when it is described as a lower stage, it indicates the wide-angle lower stage optical system 202.

A surface on which transmission light caused to two-dimensionally scan by the scanner 6 is incident and reflected is defined as "reflection surface of the wide-angle optical system 20". Note that when it is simply described as an incident surface and a reflection surface, it means incident surfaces and reflection surfaces of the wide-angle upper stage optical system 201 and the wide-angle lower stage optical system 202. Hereinafter, it may be referred to as an incident surface or a reflection surface, but in the present embodiment, the incident surface and the reflection surface mean the same surface.

A horizontal scan angle (viewing angle) dynamic range of the scanner 6 is defined as $a=a_{id}$ deg, and a vertical scan angle dynamic range of the scanner 6 is defined as $2b$ deg. The subscripts (iu and id) of am and $a_{id}$ indicate the wide-angle upper stage optical system 201 and the wide-angle lower stage optical system 202 on which transmission light is incident, respectively.

$a_{ou}$ and $a_{od}$ indicate the horizontal viewing angles of transmission light after the light passes through the wide-angle upper stage optical system 201 and the wide-angle lower stage optical system 202, respectively. The vertical viewing angles of the transmission light after the light passes through the wide-angle upper stage optical system 201 and the wide-angle lower stage optical system 202 are each b deg.

As illustrated in FIG. 7, it is constituted in such a manner that the reflection surface of the wide-angle optical system 20 is a curved surface when viewed in a horizontal cross section and is a flat surface when viewed in a vertical cross section. In the second embodiment, the incident surface is formed by a curved surface when viewed in the horizontal cross section, but this incident surface may be a flat surface, a spherical surface, or an aspherical surface.

In order to obtain the above function, the wide-angle optical system 20 has the following structure. It is constituted in such a manner that the reflection surfaces of the wide-angle upper stage optical system 201 and the wide-angle lower stage optical system 202 in the horizontal direction are rotationally symmetric with respect to the optical axis. Since the wide-angle optical system 20 is constituted by a reflection system, a reflection surface in the vertical direction is formed by a flat surface and inclined with respect to the optical axis. It is constituted in such a manner that the angles of the reflection surfaces of the wide-angle upper stage optical system 201 and the wide-angle lower stage optical system 202 in the vertical direction with respect to the optical axis have an equal absolute value. The reflection surfaces of the wide-angle upper stage optical system 201 and the wide-angle lower stage optical system 202 in the vertical direction are linearly symmetric with respect to the optical axis. The shape of the curved surface of the incident surface in the horizontal direction is similar to that of the first embodiment. A difference is that the incident surface is formed as a reflection surface. The reflection surface is made of a material having a reflectance at which reflection is possible at a wavelength used. Examples thereof include a metal vapor deposition film and a dielectric multilayer film. Other structures are similar to those of the first embodiment. Details will be described below.

As illustrated in the vertical direction (side view) of FIG. 7, it is constituted in such a manner that in a vertical scan angle dynamic range (full angle $2b$ deg) of the scanner 6, transmission light from 0 deg to +b deg is incident on the wide-angle upper stage optical system 201, and transmission light from 0 deg to −b deg is incident on the wide-angle lower stage optical system 202. The wide-angle upper stage optical system 201 and the wide-angle lower stage optical system 202 are arranged in such a manner that transmission light when the vertical scan angle of the scanner 6 is 0 deg is incident on a boundary between the wide-angle upper stage optical system 201 and the wide-angle lower stage optical system 202.

As illustrated in the horizontal direction (top view) of FIG. 7, it is constituted in such a manner that the reflection surfaces of the wide-angle upper stage optical system 201 and the wide-angle lower stage optical system 202 in the horizontal direction are symmetric with respect to the optical axis. It is constituted in such a manner that the angle $\theta_{iu}$ of the upper stage incident surface with respect to the optical axis and the angle $\theta_{id}$ of the lower stage incident surface with respect to the optical axis have an equal absolute value.

In the second embodiment, since the wide-angle optical system 20 is constituted by a reflection system, as illustrated in the vertical direction (cross-sectional view) of FIG. 7, a reflection surface in the vertical direction is formed by a flat surface and inclined with respect to the optical axis. It is constituted in such a manner that angles ($\gamma_{ou}$ and $\gamma_{od}$) of the reflection surfaces of the upper and lower stages in the vertical direction with respect to the optical axis have an equal absolute value. Therefore, the reflection surface of the upper stage in the vertical direction and the reflection surface of the lower stage in the vertical direction are constituted symmetrically with respect to the optical axis.

Since the wide-angle optical system 20 is constituted by a reflection system, transmission light output from the transmission optical system 4 is obliquely incident on a reflection surface of the scanner 6 in such a manner that transmission light after being reflected by a reflection surface of the wide-angle optical system 20 does not cause vignetting in the scanner 6. Therefore, the transmission light reflected by the reflection surface of the scanner 6 has an inclination of a (see FIG. 7) with respect to the transmission light output from the transmission optical system 4 in the vertical direction. This axis is defined as an optical axis B-B in the vertical direction. Note that an optical axis in the horizontal direction is A-A.

Due to the above configuration, in order to make the transmission light reflected by the reflection surface of the scanner incident on the incident surface of the wide-angle optical system 20, a bonding surface between the wide-angle upper stage optical system 201 and the wide-angle lower stage optical system 202 is disposed so as to pass through the optical axis B-B.

Due to the above arrangement, when positive and negative angular directions are defined from the optical axis B-B as illustrated in FIG. 7, the wide-angle upper stage optical system 201 and the wide-angle lower stage optical system 202 are constituted in such a manner that the angle $\gamma_{ou}$ of the reflection surface of the upper stage is a positive direction from the optical axis, the angle $\gamma_{ou}$ of the reflection surface of the lower stage is a negative direction from the optical axis, and the angle $\gamma_{ou}$ and the angle $\gamma_{ou}$ have an equal absolute value.

The reflection surfaces of the wide-angle upper stage optical system 201 and the wide-angle lower stage optical system 202 are made of a material having a reflectance at which reflection is possible at a wavelength used. Examples thereof include a metal vapor deposition film and a dielectric multilayer film.

Other configurations are similar to those of the first embodiment.

Next, an operation of the laser radar device according to the second embodiment of the present invention will be described. Since operations other than the operation of the wide-angle optical system 20 are similar to those in the first embodiment, description thereof will be omitted.

The scanner 6 causes laser light to two-dimensionally scan by using the following operation, and makes the laser light caused to scan incident on the incident surface of the wide-angle optical system 20.

As illustrated in FIG. 3, by performing one or more cycles of horizontal scans while performing one cycle of vertical scans, the scanner 6 performs a scan in a zigzag shape on the incident surface of the wide-angle optical system 20.

As illustrated in the side view of FIG. 7, transmission light from the transmission optical system 4 is obliquely incident on the wide-angle optical system 20 at an angle α in the vertical direction via the scanner 6.

As illustrated in FIG. 3, also in the present embodiment, transmission light incident on the wide-angle upper stage optical system 201 from the scanner 6 is emitted to the measurement field of view 1 at a distance measurement target position, and transmission light incident on the wide-angle lower stage optical system 202 from the scanner 6 is emitted to the measurement field of view 2 at the distance measurement target position.

Immediately after transmission light is emitted from the scanner 6 and before the transmission light is incident on the wide-angle optical system 20, the transmission light is propagated in the same horizontal area between the upper and lower stages. However, as illustrated in FIG. 7 (horizontal direction: top view), since the incident surface of the wide-angle upper stage optical system 201 in the horizontal direction and the incident surface of the wide-angle lower stage optical system 202 in the horizontal direction are arranged symmetrically with respect to the A-A axis, the transmission light output from the scanner 6 is reflected in different directions between the wide-angle upper stage optical system 201 and the wide-angle lower stage optical system 202, and is propagated in different horizontal directions after the transmission light is emitted from the wide-angle optical system 20.

In the vertical direction, transmission light reflected by the wide-angle upper stage optical system 201 and transmission light reflected by the wide-angle lower stage optical system 202 cause an incident angle deviation between the wide-angle upper stage optical system 201 and the wide-angle lower stage optical system 202, that is, an axis deviation. However, as illustrated in FIG. 7 (vertical direction: A-A cross-sectional view), the reflection surface of the wide-angle upper stage optical system 201 in the vertical direction and the reflection of the wide-angle lower stage optical system 202 in the vertical direction are constituted symmetrically with respect to the B-B axis. As a result, the transmission light reflected by the wide-angle upper stage optical system 201 and the transmission light reflected by the wide-angle lower stage optical system 202 are propagated so as to correct the axis deviation, and therefore the transmission light is emitted to a distance measurement target with a small vertical axis deviation at a desired distance measurement target position.

Since other components perform similar operations to those of the first embodiment, description thereof will be omitted.

As is clear from the above, according to the second embodiment of the present invention, a similar effect to that of the first embodiment is obtained. In addition, in the second embodiment, by constituting the wide-angle optical system 20 by a reflection system, a material can be selected from a larger number of materials, and for example, a resin material can be used, which makes mounting at low cost possible.

The measurement field of view 1 and the measurement field of view 2 may partially overlap with each other at the distance measurement target position. In a case where the measurement field of view 1 and the measurement field of view 2 are just adjacent to each other without overlapping, when an incident surface is formed by a flat surface, a horizontal field of view an is 2a deg, and when the incident surface is formed by a curved surface, an is larger than 2a deg. In a case where the measurement field of view 1 and the measurement field of view 2 overlap with each other by c deg, an decreases by 2c deg.

In the second embodiment, as in the first embodiment, the wide-angle optical system 20 may include a plurality of stages equal to or more than two stages. As for an application example of the plurality of stages, a case where a wide-angle optical system is constituted by a transparent system will be exemplified in a fourth embodiment below, but such a wide-angle optical system can also be constituted by the reflection system as an extension of the two stages described in the second embodiment.

Here, the reflection surface (incident surface) of the wide-angle optical system 20 is a curved surface, but may be a flat surface.

In addition, modifications of the configurations, functions, and operations described in the first embodiment can be similarly applied to the second embodiment.

Third embodiment.

In a third embodiment, by forming transmission light having a beam spread angle equal to or larger than a vertical field of view required for a laser radar device in the vertical direction by the transmission optical system 41, constituting the light receiving element described in the first embodiment by light receiving array elements 15, and constituting the scanner 6 so as to perform an angular scan in the horizontal direction, similar measurement results to those in a case of performing a biaxial angular scan by a uniaxial angular scan can be obtained.

Figure 8:
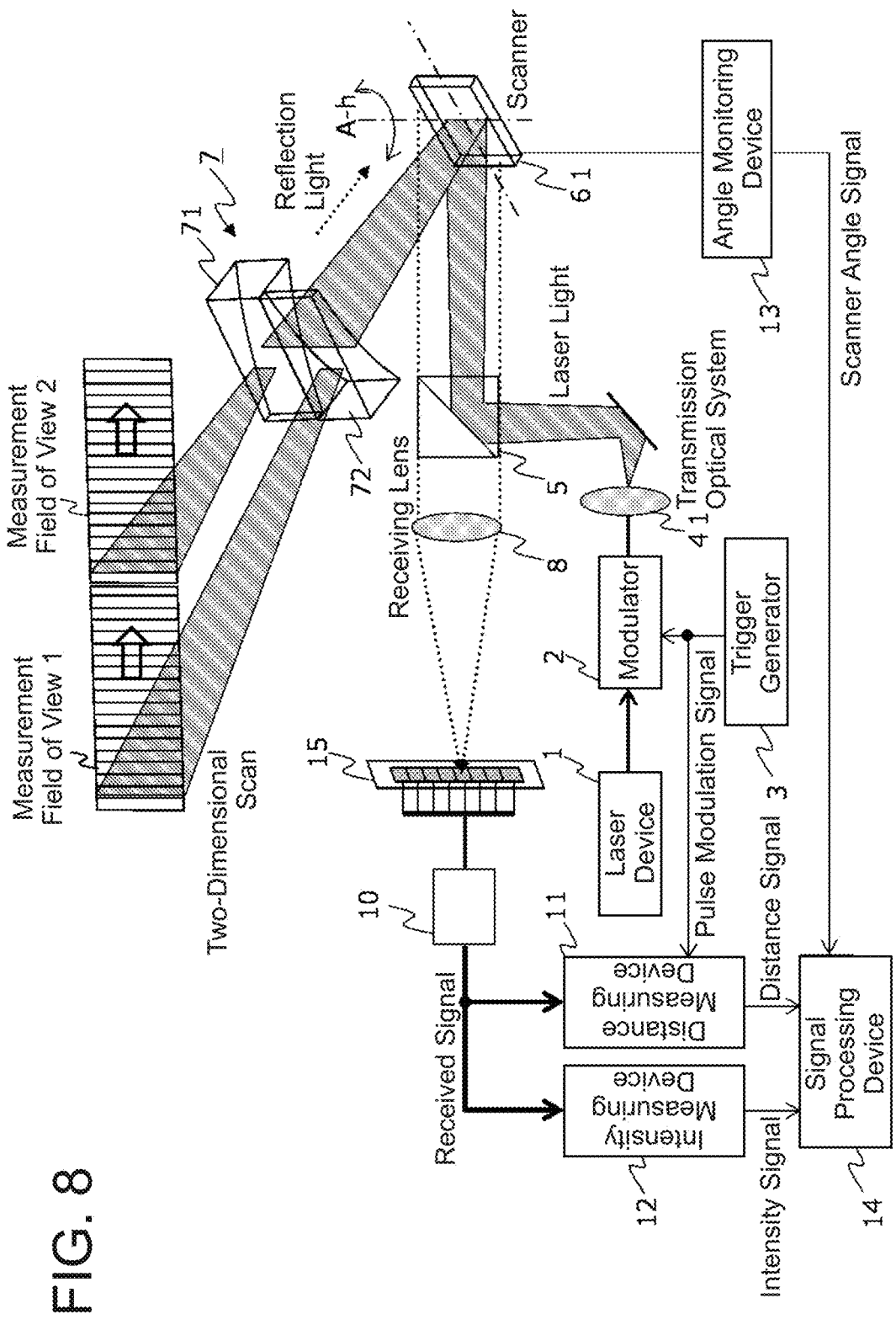
FIG. 8 is a configuration diagram illustrating a configuration example of a laser radar device according to a third embodiment of the present invention.

FIG. 8 is a configuration diagram illustrating a configuration example of a laser radar device according to the third embodiment of the present invention. The laser radar device includes a laser light source 1, a modulator 2, a trigger generator 3, a transmission optical system 41, a transmission and reception separating optical system 5, a scanner 61, a wide-angle optical system 7, a receiving lens 8, light receiving array elements 15, a current to voltage converter 10, a distance measuring device 11, an intensity measuring device 12, an angle monitoring device 13, and a signal processing device 14.

The scanner 61 has a horizontal uniaxial angular scanning function.

When an axis for scanning in the horizontal direction is defined as A-h (see FIG. 8), the scanner 61 has a function of performing a one-dimensional scan by performing an angular scan at a predetermined cycle on the basis of A-h. In addition, the scanner 61 has a function of receiving reception light output from the wide-angle optical system 7 and guiding the reception light to the transmission and reception separating optical system 5.

Examples of the scanner 61 include a resonance type scanner such as a MEMS mirror or a resonant scanner, and a non-resonance type scanner such as a galvano scanner.

The configuration and function of the wide-angle optical system 7 are similar to those in FIG. 2.

The light receiving array elements 15 have a function of converting light received by each of the elements into a current and outputting the light received by each of the elements as a reception current signal.

Examples of the light receiving array elements 15 include a photodiode array and an avalanche photodiode array. The number of the light receiving array elements 15 is set depending on the number of pixels in the vertical direction required for the laser radar device. The number of pixels may be set depending on spatial resolution and angular resolution desired for the laser radar device.

Other configurations are similar to those of the first embodiment.

Note that the wide-angle optical system 7 may be constituted by a reflection system, and the configuration of the wide-angle optical system 7 in this case is the wide-angle optical system 20.

Next, an operation of the laser radar device according to the second embodiment of the present invention will be described. Since operations other than the operations of the transmission optical system 41, the scanner 61, and the light receiving array element 15 are similar to those in the first embodiment, description thereof will be omitted.

The transmission optical system 41 receives transmission light (pulsed laser light) from the modulator 2 and forms the transmission light into transmission light having a predetermined beam diameter and a predetermined beam spread angle. In the third embodiment, a horizontal beam spread angle after emission from the transmission optical system 41 is set in such a manner that transmission light to a distance measurement target is collimated light in the horizontal direction after output from the wide-angle optical system 7.

The transmission optical system 41 sets a vertical beam spread angle to a beam spread angle equal to or larger than a vertical field of view required for the laser radar device in the vertical direction.

In addition, regarding a beam diameter in the horizontal direction, the transmission optical system 41 is set depending on specifications of a finally output distance, spatial resolution of an intensity image, and angular resolution for the laser radar device.

In addition, the transmission optical system 41 includes a spherical or aspherical convex lens, a concave lens, a plano-convex lens, a plano-concave lens, or a combination thereof, and shapes light into a desired beam shape.

The scanner 61 causes laser light to one-dimensional scan by using the following operation, and makes the laser light caused to scan incident on the incident surface of the wide-angle optical system 7.

Figure 9:
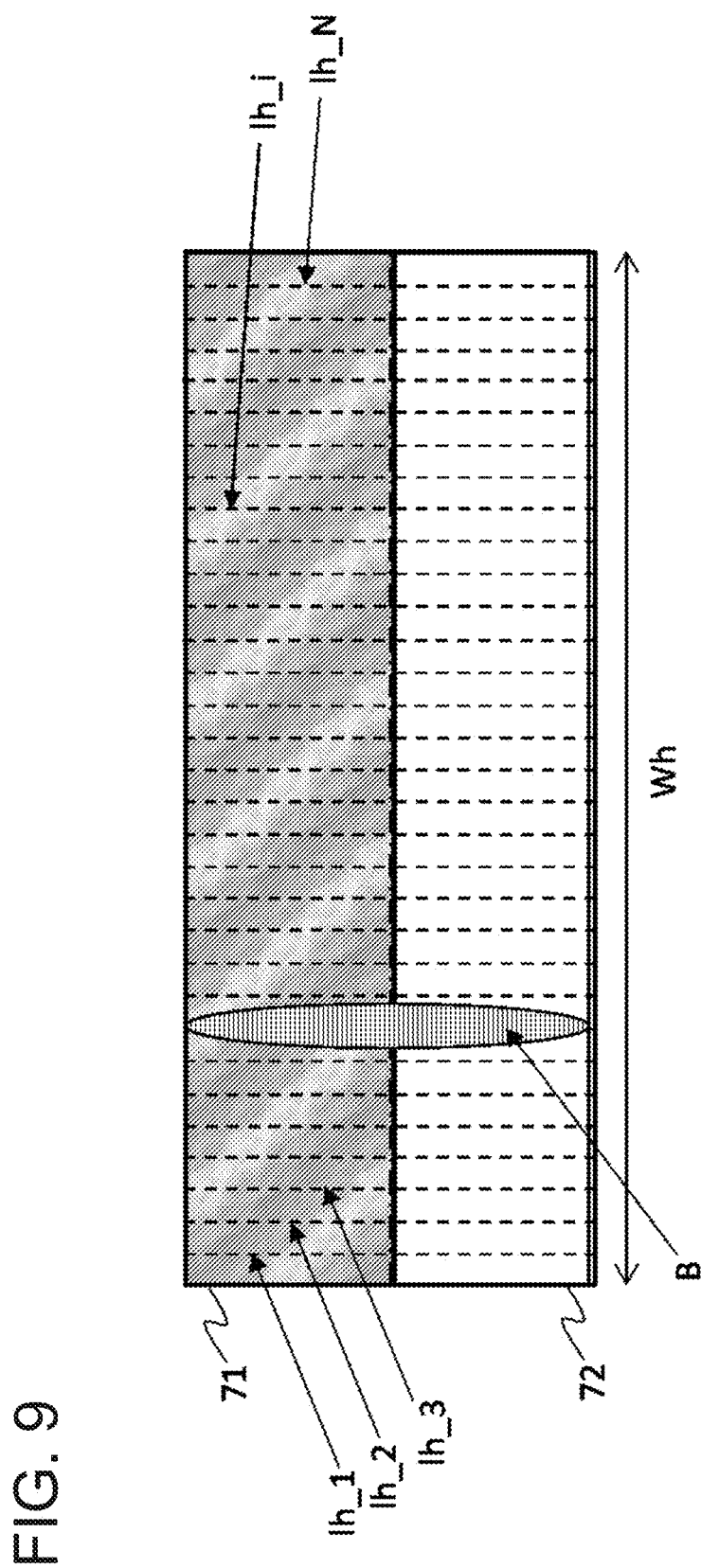
FIG. 9 is a diagram illustrating a scan position on an incident surface of a wide-angle optical system 7 of the laser radar device according to the third embodiment of the present invention.

FIG. 9 is a diagram illustrating a scan position on an incident surface of the wide-angle optical system 7 of the laser radar device according to the third embodiment of the present invention.

The elliptical hatched region B in FIG. 9 indicates a beam pattern of transmission light incident on the wide-angle optical system 7.

The transmission optical system 41 shapes light into transmission light having a spread angle in the vertical direction, and the scanner 61 causes the transmission light having a spread angle in the vertical direction to perform a beam scan in the horizontal direction. As a result, as illustrated in FIG. 9, the transmission light spread in the vertical direction is emitted onto an incident surface of the wide-angle optical system 7, and a scan is performed in a mode of movement of the transmission light in the horizontal direction by the horizontal scan.

In FIG. 9, each of broken lines $1h\_1$ to $1h$ N indicates the position of transmission light emitted to the incident surface of the wide-angle optical system 7. Note that $1h$ means a line, and a subscript number thereof indicates a line number.

An interval between the broken lines in FIG. 9 is determined by a laser repetition cycle and a horizontal angular scan cycle of the scanner.

As an example of one-dimensional scan, when the laser repetition frequency is 10 Hz and the horizontal angular scan cycle is 1 Hz, scan including 5 lines in each of a forward path and a return path (one cycle in total) in the horizontal direction is achieved on the incident surface of the wide-angle optical system.

The case of the above example corresponds to N=5. The laser repetition cycle is set depending on the number of pixels desired for the laser radar device. The number of pixels may be set depending on spatial resolution and angular resolution desired for the laser radar device.

Pulsed laser light caused to one-dimensionally scan by the scanner 61 is incident on the incident surface of the wide-angle optical system 7.

Figure 10:
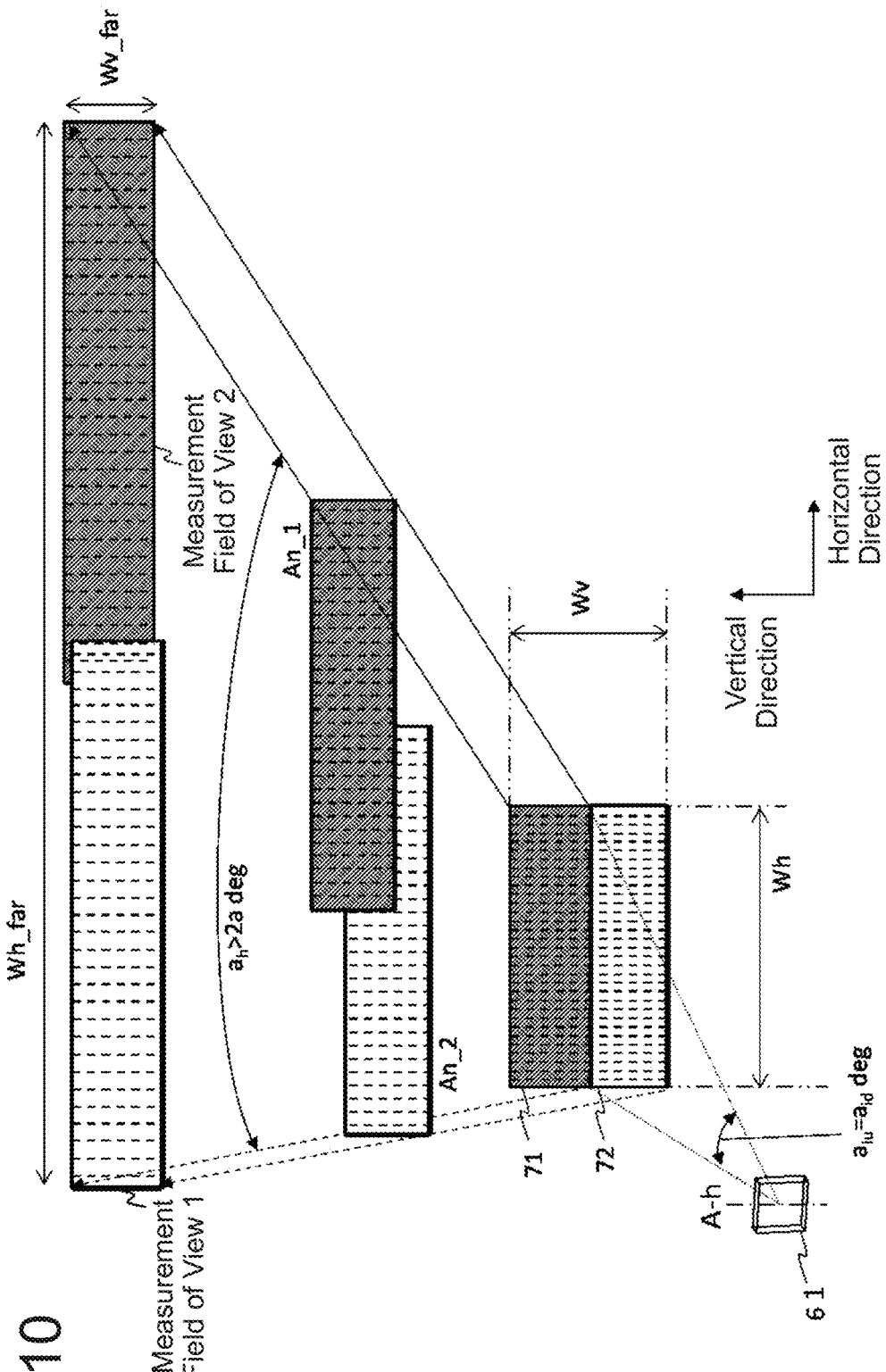
FIG. 10 is a diagram explaining widening of a field of view of the laser radar device according to the third embodiment of the present invention.

FIG. 10 is a diagram explaining widening of a field of view of the laser radar device according to the third embodiment of the present invention. An operation of the wide-angle optical system 7 will be described by referring to FIG. 10.

In FIG. 10, An_1 and An_2 indicate areas scanned by the wide-angle upper stage optical system 71 and the wide-angle lower stage optical system 72 in a vicinity region after emission from the wide-angle optical system, respectively. A measurement field of view 1 and a measurement field of view 2 indicate measurement fields of view of the wide-angle upper stage optical system 71 and the wide-angle lower stage optical system 72 at a distance measurement target position, respectively. Wh_far indicates a horizontal scan area at the distance measurement target position, and Wv_far indicates a vertical scan area at the distance measurement target position. The vertical broken lines illustrated in the wide-angle upper stage optical system 71, the wide-angle lower stage optical system 72, An_1, An_2, the measurement field of view 1, and the measurement field of view 2 schematically illustrate spot positions of a transmission beam illustrated in B of FIG. 9, and illustrate a state in which a scan is performed only in the horizontal direction.

In the third embodiment, only the shape of transmission light transmitted to the wide-angle upper stage optical system 71, the wide-angle lower stage optical system 72, An_1, An_2, the measurement field of view 1, and the measurement field of view 2, and the scanning method are different, and therefore an operation with respect to the horizontal viewing angle is similar to that described above.

When a beam spread angle (full angle) in the vertical direction is θv, the incident angles on the wide-angle upper stage optical system 71 and the wide-angle lower stage optical system 72 are each θv/2 deg, and therefore the vertical scan angle (=vertical viewing angle for the laser radar device) after emission from the wide-angle optical system is θv/2 deg. An operation related to the viewing angle in the vertical direction is similar to that described above.

Scattered light from a distance measurement target object is output as reception light to the transmission and reception separating optical system 5 via the wide-angle optical system 7 and the scanner 61.

The transmission and reception separating optical system 5 outputs the scattered light from the distance measurement target object as reception light to the receiving lens 8.

The receiving lens 8 collects the reception light and collects the reception light on the light receiving array elements 15.

The light receiving array elements 15 receive the collected reception light, convert the received light into a current for each pixel, and output each current signal of the converted reception light to the current to voltage converter 10. This current signal of the reception light is a pulsed signal.

The current to voltage converter 10 converts the current signal of each pixel into a voltage signal for each pixel and outputs the voltage signal to the distance measuring device 11 and the intensity measuring device 12.

Other components perform similar operations to those of the first embodiment.

As is clear from the above, according to the third embodiment of the present invention, a similar effect to that of the first embodiment is obtained. In addition, by setting an axis for performing an angular scan of the scanner 61 to one axis, adjustment to accurately match the horizontal and vertical two-axis angular scan controls with each other is avoided, and therefore complexity in scanner manufacturing and control is reduced. This makes it possible to reduce cost and size of the device. In addition, when it is difficult to manufacture a scanner reflection surface which is difficult to lengthen in the vertical direction, it is possible to solve this problem.

Note that the third embodiment has been described by exemplifying the configuration in which the scanner 61 has a single reflection surface, but it is not limited thereto, and reflection surfaces of the scanner 61 may be arrayed in the vertical direction or in the vertical and horizontal directions in such a manner that each element can independently perform an angular scan.

The light receiving array elements 15 may be arrayed not only in the vertical direction but also in the horizontal direction.

In addition, modifications of the configurations, functions, and operations described in the first and second embodiments can be similarly applied to the third embodiment.

Fourth Embodiment

In the fourth embodiment, a case where a wide-angle optical system 30 includes three stages of a wide-angle upper stage optical system 301, a wide-angle middle stage optical system 302, and a wide-angle lower stage optical system 303 will be described. Note that, hereinafter, when it is described as an upper stage, it indicates the wide-angle upper stage optical system 301, when it is described as a middle stage, it indicates the wide-angle middle stage optical system 302, and when it is described as a lower stage, it indicates the wide-angle lower stage optical system 303.

Figure 11:
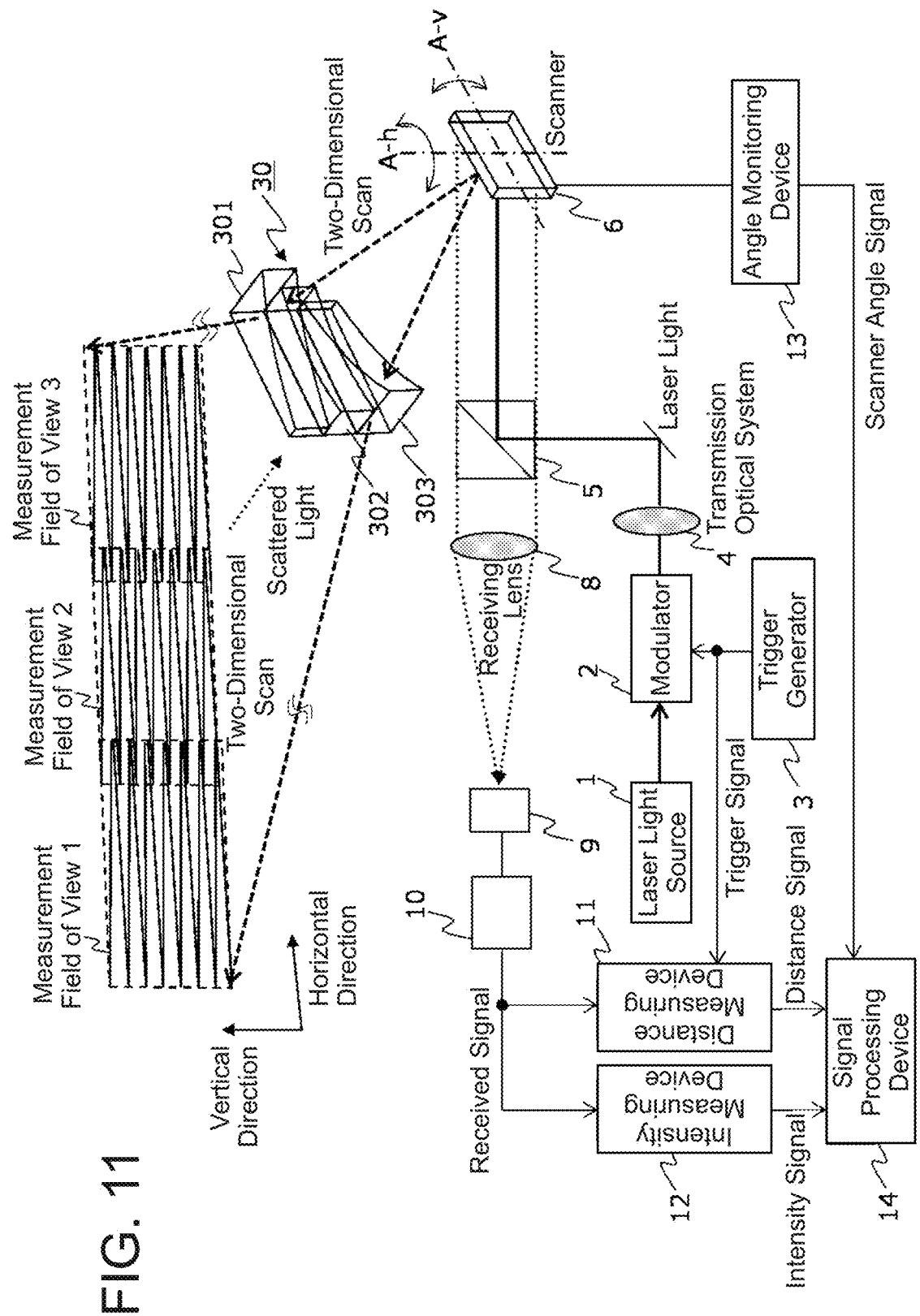
FIG. 11 is a configuration diagram illustrating a configuration example of a laser radar device according to a fourth embodiment of the present invention.

FIG. 11 is a configuration diagram illustrating a configuration example of a laser radar device according to the fourth embodiment of the present invention. The laser radar device includes a laser light source 1, a modulator 2, a trigger generator 3, a transmission optical system 4, a transmission and reception separating optical system 5, a scanner 6, a wide-angle optical system 30, a receiving lens 8, a light receiving element 9, a current to voltage converter 10, a distance measuring device 11, an intensity measuring device 12, an angle monitoring device 13, and a signal processing device 14.

Figure 12:
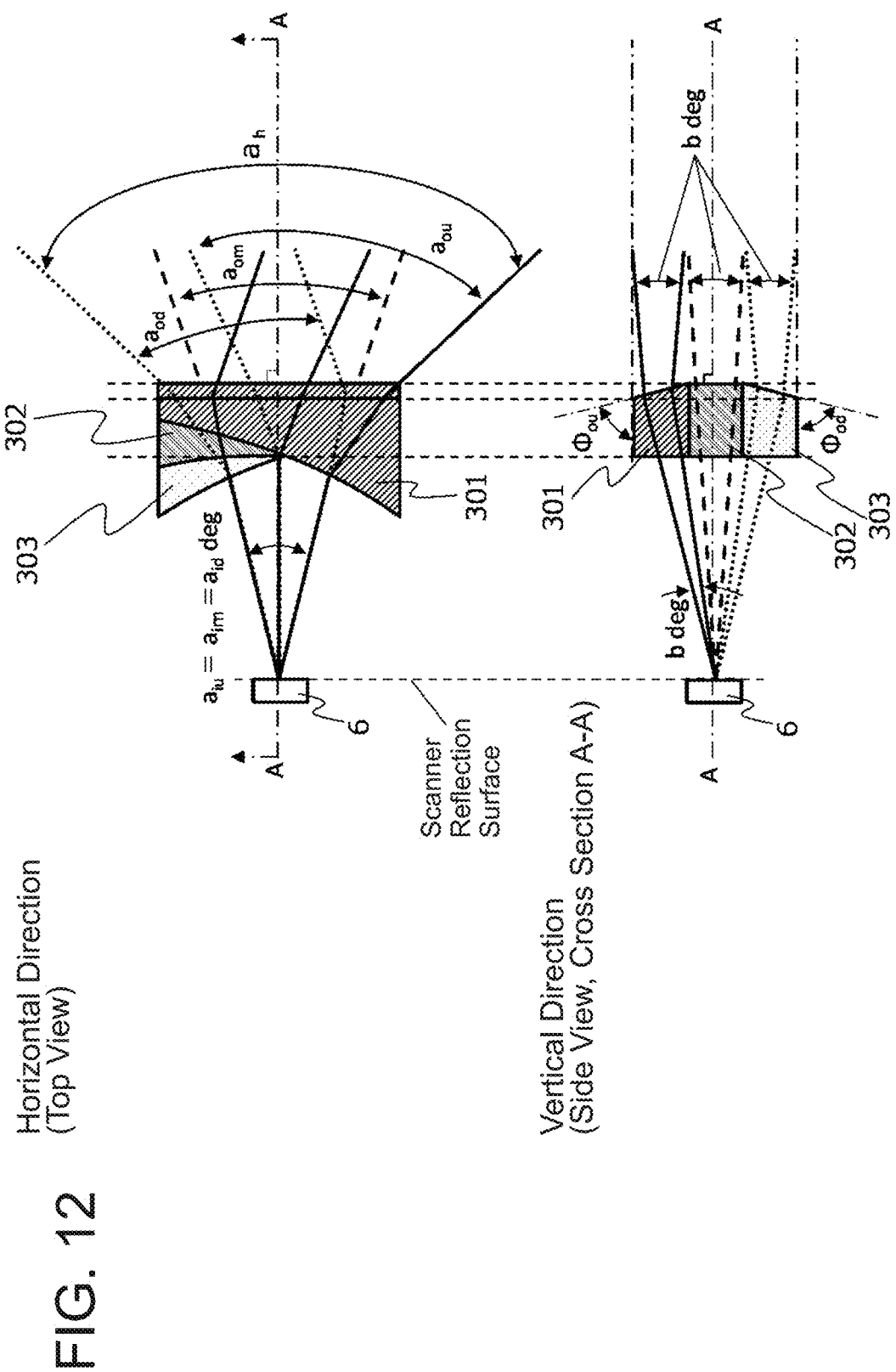
FIG. 12 is a configuration diagram illustrating a configuration example of a wide-angle optical system 30 of the laser radar device according to the fourth embodiment of the present invention.

FIG. 12 is a configuration diagram illustrating a configuration example of the wide-angle optical system 30 of the laser radar device according to the fourth embodiment of the present invention.

The wide-angle optical system 30 includes the wide-angle upper stage optical system 301, the wide-angle middle stage optical system 302, and the wide-angle lower stage optical system 303.

In FIG. 12, a scan angle (viewing angle) dynamic range of transmission light of the scanner 6 in the horizontal direction is $a=a_{iu}=a_{im}=a_{id}$ deg, and subscripts (iu, im, and id) thereof indicate the wide-angle upper stage optical system 301, the wide-angle middle stage optical system 302, and the wide-angle lower stage optical system 303 on which transmission light is incident, respectively. $a_{ou}$, $a_{om}$, and $a_{od}$ indicate the horizontal viewing angles of transmission light after the light passes through the wide-angle upper stage optical system 301, the wide-angle middle stage optical system 302, and the wide-angle lower stage optical system 303, respectively.

A scan angle (viewing angle) dynamic range of transmission light of the scanner 6 in the vertical direction is 3b deg, and transmission light having b deg is incident on each of the wide-angle upper stage optical system 301, the wide-angle middle stage optical system 302, and the wide-angle lower stage optical system 303. The vertical viewing angles of the transmission light after the light passes through the wide-angle upper stage optical system 301, the wide-angle middle stage optical system 302, and the wide-angle lower stage optical system 303 are each b deg.

$\Phi_{ou}$ indicates an angle between the optical axis and the upper stage emission surface, and $\Phi_{od}$ indicates an angle between the optical axis and the lower stage emission surface, and $\Phi_{ou}=\Phi_{od}$ is satisfied. In the side view of FIG. 12, $\Phi_{ou}$ and $\Phi_{od}$ are defined in such a manner that a counterclockwise direction from the optical axis is negative and a clockwise direction from the optical axis is positive.

The emission surfaces of the wide-angle upper stage optical system 301 and the wide-angle lower stage optical system 303 in the vertical direction are symmetric with respect to the optical axis A-A as in the first embodiment, and $|\Phi_{ou}|=|\Phi_{od}|$ is satisfied.

The horizontal incident surface of the wide-angle middle stage optical system 302 is formed by a curved surface as in the upper and lower stages, and the horizontal and vertical emission surfaces of the wide-angle middle stage optical system 302 are formed by flat surfaces. Note that when adjacent fields of view of the measurement field of views 1, 2, and 3 partially overlap with each other or are adjacent to each other without a gap at a measurement target distance, the incident surface in the horizontal direction may be a flat surface, a spherical surface, or an aspherical surface instead of a curved surface, and the emission surfaces in the horizontal and vertical directions do not have to be flat surfaces.

In order to obtain the above functions, the wide-angle optical system 30 has the following structure. The wide-angle optical system 30 differs from the wide-angle optical system 7 in that the middle stage optical system is inserted between the upper and lower stages. The incident surface of the middle stage is formed by a curved surface with respect to the horizontal direction and is rotationally symmetric with respect to the optical axis. The emission surface is formed by a flat surface not inclined with respect to the horizontal and vertical directions. Other structures are similar to those in the first embodiment.

The incident surface of the wide-angle middle stage optical system 302 in the vertical direction is constituted in such a manner that transmission light having a horizontal scan angle of 0 deg of the scanner 6 is vertically incident. That is, the angle of the incident surface of the wide-angle middle stage optical system 302 in the vertical direction with respect to the optical axis A-A is 90 deg. The wide-angle middle stage optical system 302 is disposed in such a manner that the center is located on the optical axis A-A in the side view in FIG. 12.

As illustrated in the horizontal direction (top view) in FIG. 12, the incident surface in the horizontal direction is constituted in such a manner that the horizontal viewing angle of transmission light after emission from the middle stage is symmetric with respect to the optical axis A-A. Therefore, for example, when the incident surface is a spherical surface, the center of curvature is located on A-A.

Next, an operation of the laser radar device according to the fourth embodiment of the present invention will be described. Since operations other than the operation of the wide-angle optical system 30 are similar to those in the first embodiment, description thereof will be omitted.

Pulsed laser light caused to two-dimensionally scan by the scanner 6 is incident on the incident surface of the wide-angle optical system 30.

Regarding transmission light that has passed through the wide-angle optical system 30, as illustrated in FIG. 11, transmission light incident on the wide-angle upper stage optical system 301 from the scanner 6 is emitted to the measurement field of view 1 at a distance measurement target position, transmission light incident on the wide-angle lower stage optical system 303 from the scanner 6 is emitted to the measurement field of view 3 at the distance measurement target position, and transmission light incident on the wide-angle middle stage optical system 302 from the scanner 6 is emitted to the measurement field of view 2 at the distance measurement target position.

As illustrated in FIG. 12, since the incident surfaces of the wide-angle optical system 30 in the horizontal direction are arranged in different directions among the upper, lower, and middle stages, immediately after emission from the scanner 6 and before incidence on the wide-angle optical system 30, transmission light propagated in the same horizontal area among the upper, middle, and lower stages is propagated in different horizontal directions after emission from the wide-angle optical system 30.

In addition, by constituting the emission surface of the wide-angle optical system 30 in the vertical direction as illustrated in FIG. 12, transmission light from the upper, lower, and middle stages emitted from the wide-angle optical system 30 is emitted to a distance measurement target without vertical axis deviation at a desired distance measurement target position.

Other components perform similar operations to those of the first embodiment.

As is clear from the above, according to the fourth embodiment of the present invention, a similar effect to that of the first embodiment is obtained. In addition, since the wide-angle optical system 30 includes three stages of the wide-angle upper stage optical system 301, the wide-angle middle stage optical system 302, and the wide-angle lower stage optical system 303, a wider viewing angle than that of the first embodiment can be obtained.

The matters described in the first to third embodiments are as follows: (1) an inclined surface of a flat surface for correcting the vertical direction is formed on the incident surface of the wide-angle optical system 30, and a curved surface is formed on the emission surface thereof; (2) the wide-angle optical system 30 is constituted by a reflection system; (3) a light receiving element array is used for the light receiving element, and the like, and may be applied to the wide-angle optical system 30 having a plurality of stages as illustrated in the fourth embodiment.

In addition, modifications of the configurations, functions, and operations described in the first, second, and third embodiments can be similarly applied to the fourth embodiment.

REFERENCE SIGNS LIST

1: laser light source, 2: modulator, 3: trigger generator, 4: transmission optical system, 5: transmission and reception separating optical system, 6, 61: scanner, 7, 20, 30: wide-angle optical system, 71, 201, 301: wide-angle upper stage optical system, 302: wide-angle middle stage optical system, 72, 202, 303: wide-angle lower stage optical system, 8: receiving lens, 9: light receiving element, 10: current to voltage converter, 11: distance measuring device, 12: intensity measuring device, 13: angle monitoring device, 14: signal processing device, 15: light receiving array elements

The invention claimed is:

1. A laser radar device comprising:
a light source to output laser light;
a scanner to cause the laser light to scan;
a first optical system to receive the laser light caused to scan by the scanner and incident on the first optical system, and emit the incident laser light in such a manner that a horizontal component of the incident laser light is different from a horizontal component of the laser light to be emitted; and
a second optical system to receive the laser light caused to scan by the scanner and incident on the second optical system, and emit the incident laser light in such a manner that an incident area of the incident laser light in the horizontal direction is the same as an incident area of the first optical system in the horizontal direction, and an emission area of the incident laser light is different from an emission area of the first optical system, wherein
the first optical system emits the incident laser light in such a manner that a positive/negative sign of a vertical component of the incident laser light is different from a positive/negative sign of a vertical component of the laser light to be emitted, and
the second optical system emits the incident laser light in such a manner that an incident area of the second optical system in the vertical direction and an incident area of the first optical system in the vertical direction are symmetric with respect to an optical axis, and a positive/negative sign of a vertical component of the incident laser light is different from a positive/negative sign of a vertical component of the laser light to be emitted.

2. The laser radar device according to claim 1, wherein the first optical system reflects the incident laser light and emits the reflected laser light, and the second optical system reflects the incident laser light and emits the reflected laser light.

3. The laser radar device according to claim 1, wherein a horizontal component of a normal vector of an incident surface of the first optical system is different from a horizontal component of a normal vector of an incident surface of the second optical system, and a horizontal component of a normal vector of an emission surface of the first optical system is the same as a horizontal component of a normal vector of an emission surface of the second optical system.

4. The laser radar device according to claim 1, wherein a horizontal component of a normal vector of an incident surface of the first optical system is the same as a horizontal component of a normal vector of an incident surface of the second optical system, and a horizontal component of a normal vector of an emission surface of the first optical system is different from a horizontal component of a normal vector of an emission surface of the second optical system.

5. The laser radar device according to claim 1, further comprising a transmission optical system for vertically spreading the laser light output from the light source and outputting the vertically spread laser light to the scanner.

* * * * *